United States Patent
Simonette et al.

(10) Patent No.: US 10,190,803 B2
(45) Date of Patent: Jan. 29, 2019

(54) SYSTEM AND METHOD FOR CLEANING SURFACES

(71) Applicant: Dynamis Solutions, LLC, Las Vegas, NV (US)

(72) Inventors: Dallas Simonette, Las Vegas, NV (US); Houston Simonette, Las Vegas, NV (US)

(73) Assignee: Dynamis Solutions, LLC, Las Vegas, NV (US)

( * ) Notice: Subject to any disclaimer, the term of this patent is extended or adjusted under 35 U.S.C. 154(b) by 0 days.

(21) Appl. No.: 14/863,739

(22) Filed: Sep. 24, 2015

(65) Prior Publication Data

US 2017/0089610 A1   Mar. 30, 2017

(51) Int. Cl.
| | |
|---|---|
| F24S 40/20 | (2018.01) |
| B08B 1/00 | (2006.01) |
| B08B 1/04 | (2006.01) |
| G02B 19/00 | (2006.01) |
| G02B 27/00 | (2006.01) |
| F24S 40/80 | (2018.01) |
| F24S 30/452 | (2018.01) |
| F24S 23/77 | (2018.01) |

(52) U.S. Cl.
CPC ............. F24S 40/20 (2018.05); B08B 1/005 (2013.01); B08B 1/007 (2013.01); B08B 1/04 (2013.01); F24S 23/77 (2018.05); F24S 30/452 (2018.05); F24S 40/85 (2018.05); G02B 19/0042 (2013.01); G02B 27/0006 (2013.01); *Y02E 10/47* (2013.01)

(58) Field of Classification Search
None
See application file for complete search history.

(56) References Cited

U.S. PATENT DOCUMENTS

| 2,787,803 A | 4/1957 | Cella | |
|---|---|---|---|
| 4,247,182 A * | 1/1981 | Smith | F24J 2/16 |
| | | | 126/570 |

(Continued)

FOREIGN PATENT DOCUMENTS

| CN | 201291220 Y | 8/2009 |
|---|---|---|
| DE | 10 2011 017 822 A1 | 10/2012 |

(Continued)

OTHER PUBLICATIONS

English Machine Translation of CN 201291220 Y, Aug. 19, 2009.*

(Continued)

*Primary Examiner* — Derek S Chapel
(74) *Attorney, Agent, or Firm* — Dicke, Billig & Czaja, PLLC

(57) ABSTRACT

A system and method for cleaning surfaces is disclosed. The system includes an elongated blade configured to remove at least one of dirt, dust, debris and film from a smooth surface. A drive system is provided for causing the blade to contact the entire smooth surface, thereby removing at least a portion of at least one of dirt, dust, debris, and film. A cleaning device automatically cleans the blade before and after the blade is cleaning the smooth surface. In one example, system is part of a heliostat system for use in a solar collection field as part of a concentrated solar power (CSP) plant.

23 Claims, 26 Drawing Sheets

(56) References Cited

U.S. PATENT DOCUMENTS

| | | | | |
|---|---|---|---|---|
| 4,291,677 A | * | 9/1981 | Monk | F24J 2/07 126/570 |
| 4,567,621 A | | 2/1986 | Alley, Jr. | |
| 4,936,670 A | * | 6/1990 | Yoo | G02B 7/1827 248/480 |
| 6,324,718 B1 | * | 12/2001 | Johnson | B60R 1/0602 15/250.003 |
| 6,654,982 B1 | * | 12/2003 | Cowan | B60Q 1/2665 15/250.003 |
| 7,856,693 B1 | * | 12/2010 | Johnson | B60R 1/0602 15/250.003 |
| 8,689,393 B2 | | 4/2014 | Ota | |
| 8,726,458 B1 | | 5/2014 | Mahr et al. | |
| 2010/0206294 A1 | * | 8/2010 | Blair | F24J 2/461 126/600 |
| 2011/0000515 A1 | | 1/2011 | Patwardhan et al. | |
| 2011/0126378 A1 | * | 6/2011 | Ota | B08B 5/02 15/405 |
| 2012/0036676 A9 | | 2/2012 | Ota | |
| 2012/0297622 A1 | | 11/2012 | Ozkul | |
| 2013/0133641 A1 | | 5/2013 | Shvets | |
| 2013/0206167 A1 | | 8/2013 | Mor et al. | |
| 2013/0276831 A1 | * | 10/2013 | Alsadah | B08B 3/02 134/18 |
| 2013/0284207 A1 | | 10/2013 | Vincente Pena et al. | |
| 2014/0041698 A1 | * | 2/2014 | Adler | B08B 1/008 134/56 R |
| 2016/0178241 A1 | * | 6/2016 | Jeanty | F24J 2/461 15/250.003 |

FOREIGN PATENT DOCUMENTS

| | | |
|---|---|---|
| EP | 2 330 363 A1 | 8/2011 |
| EP | 2385322 | 11/2011 |
| JP | 5192946 | 5/2013 |
| WO | 2011/135568 | 11/2011 |
| WO | 2012/126559 | 9/2012 |

OTHER PUBLICATIONS

English Machine Translation of EP 2385322 A2, Nov. 9, 2011.*
Adjacent Definition, retrieved from <http://www.thefreedictionary.com/p/adjacent> on Aug. 30, 2013, pp. 1-3.*

* cited by examiner

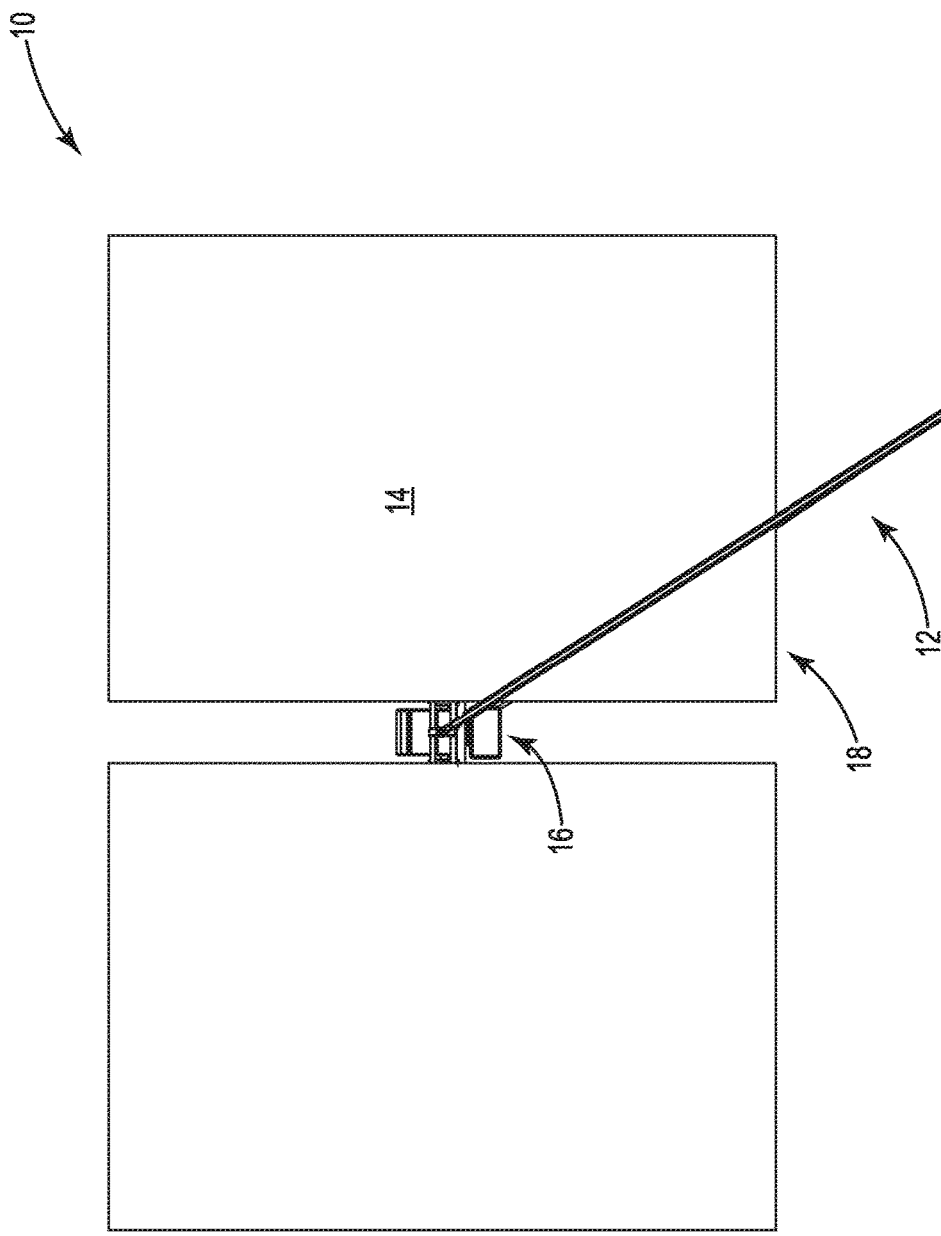

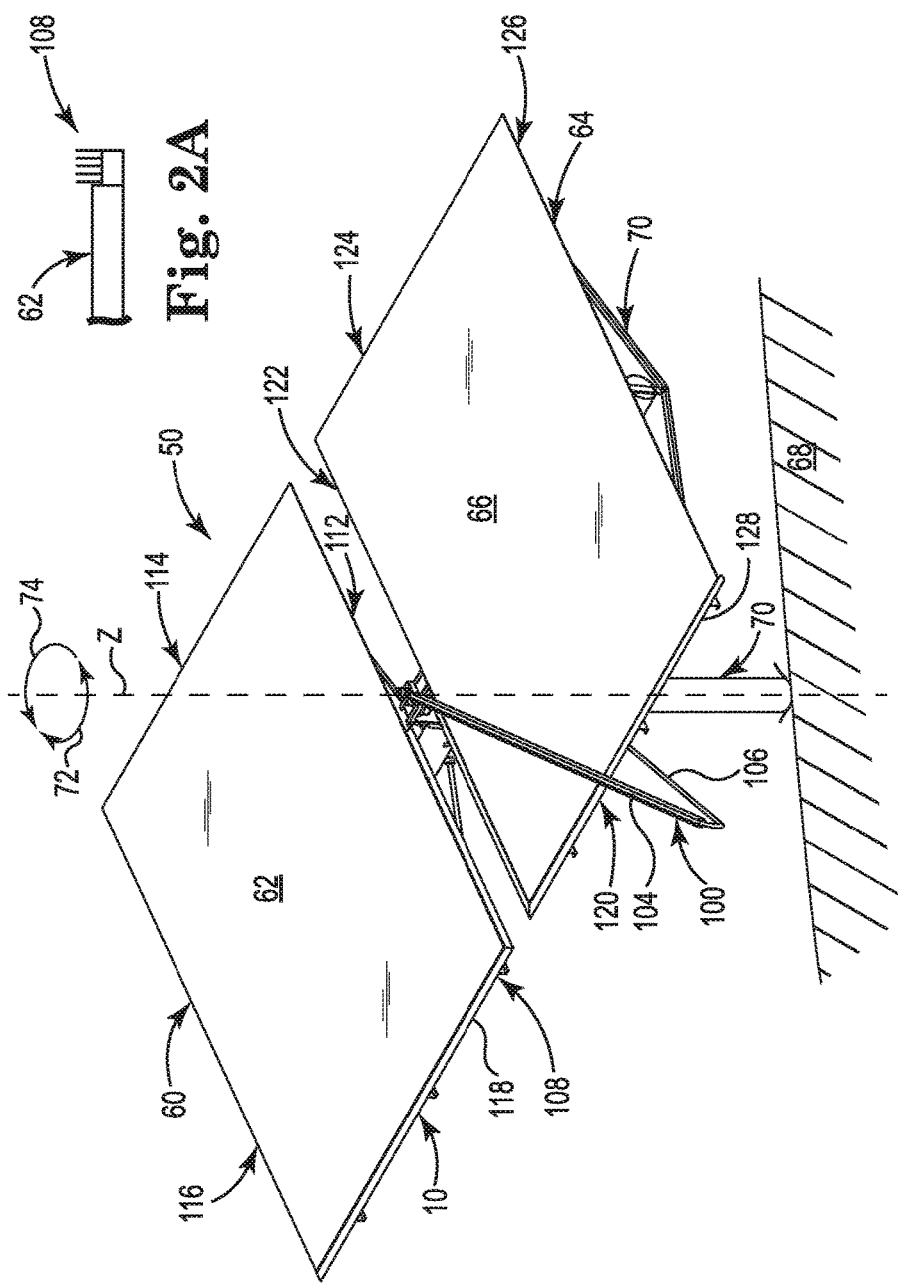

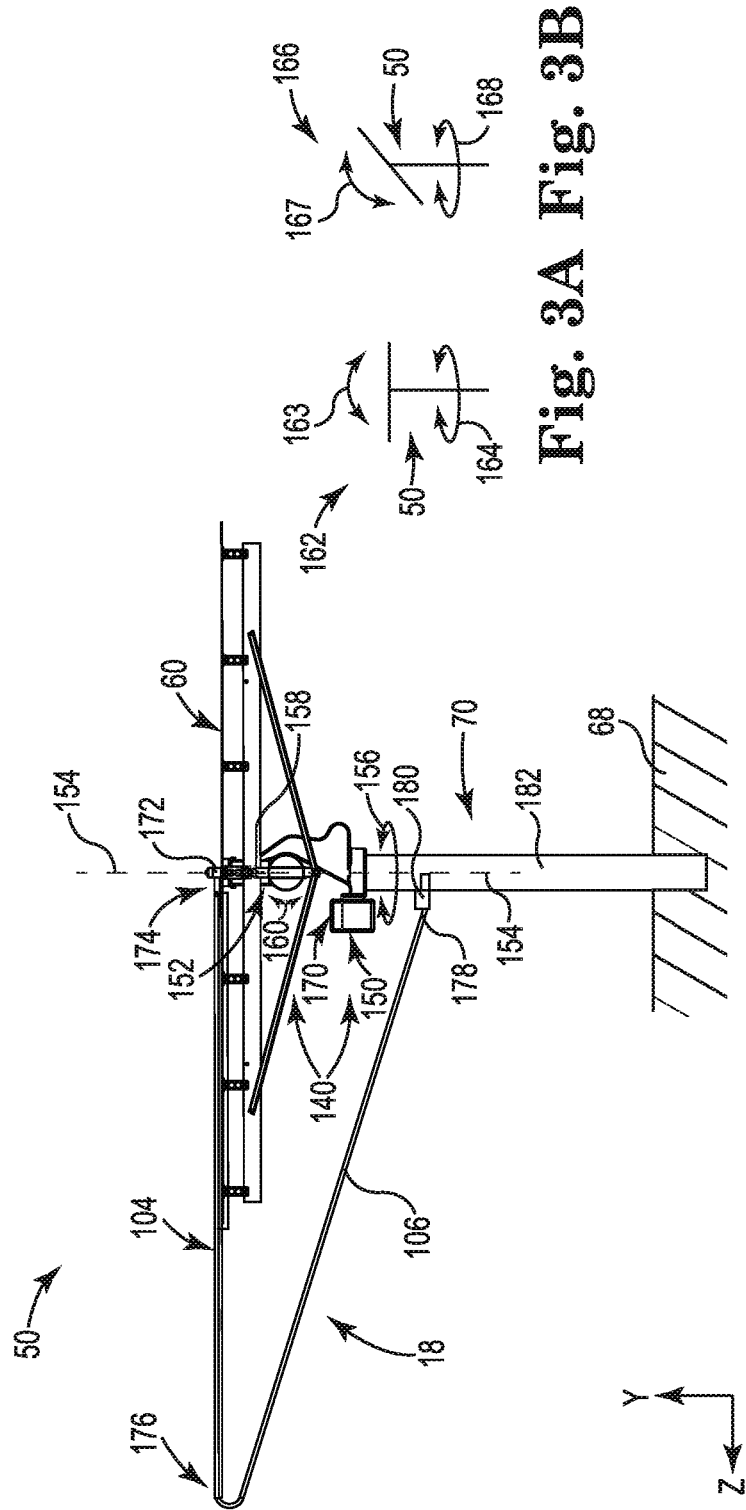

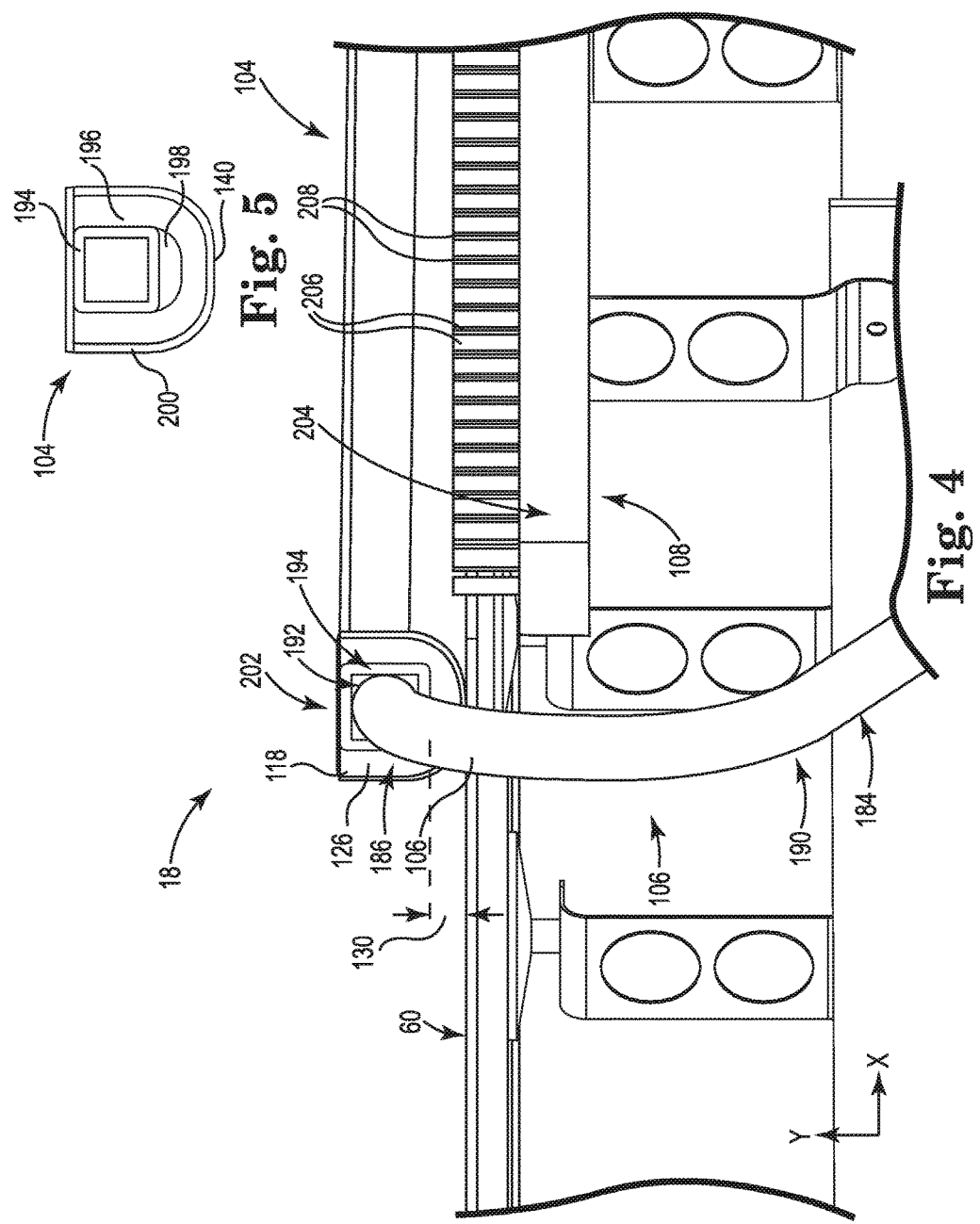

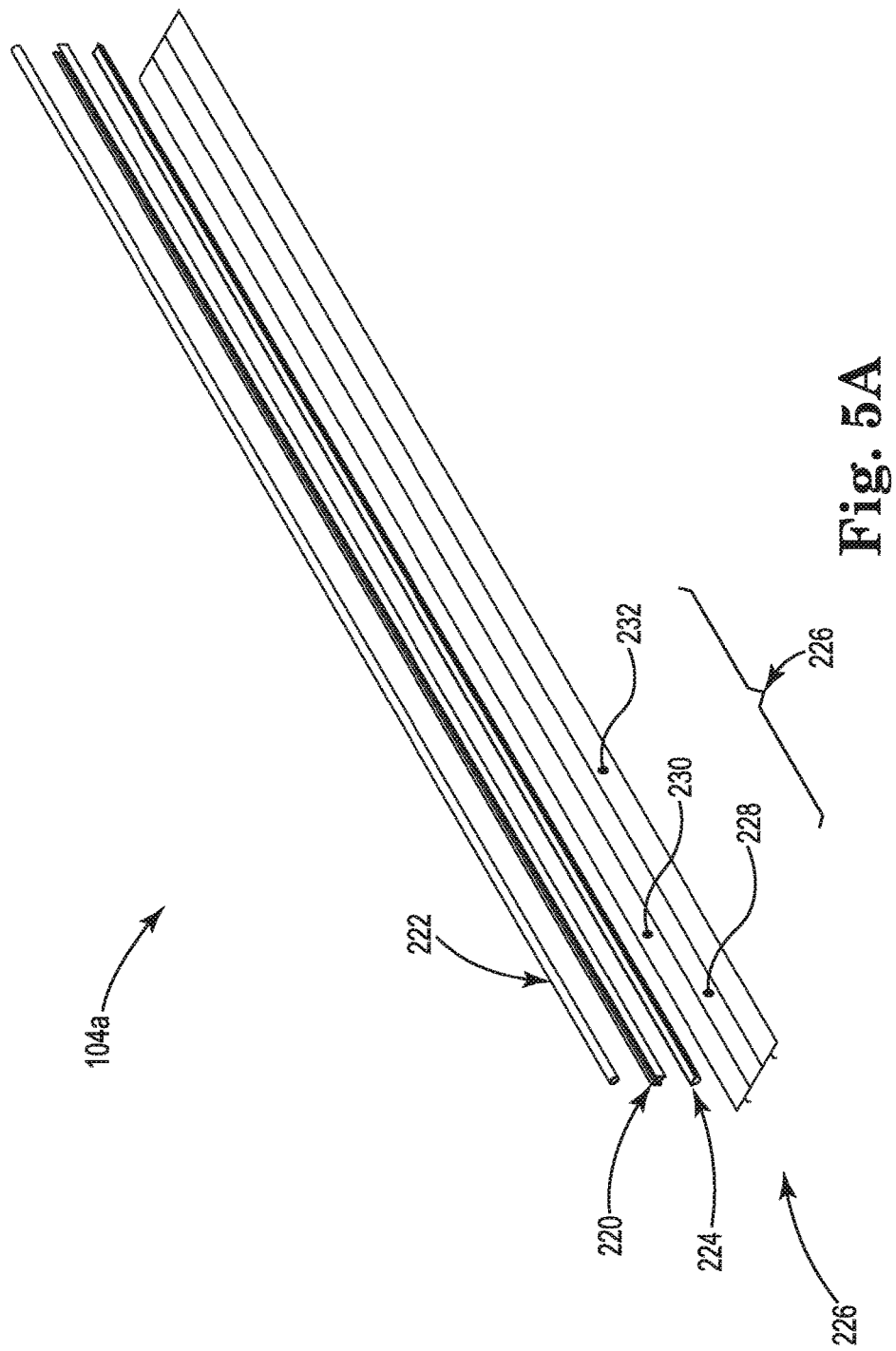

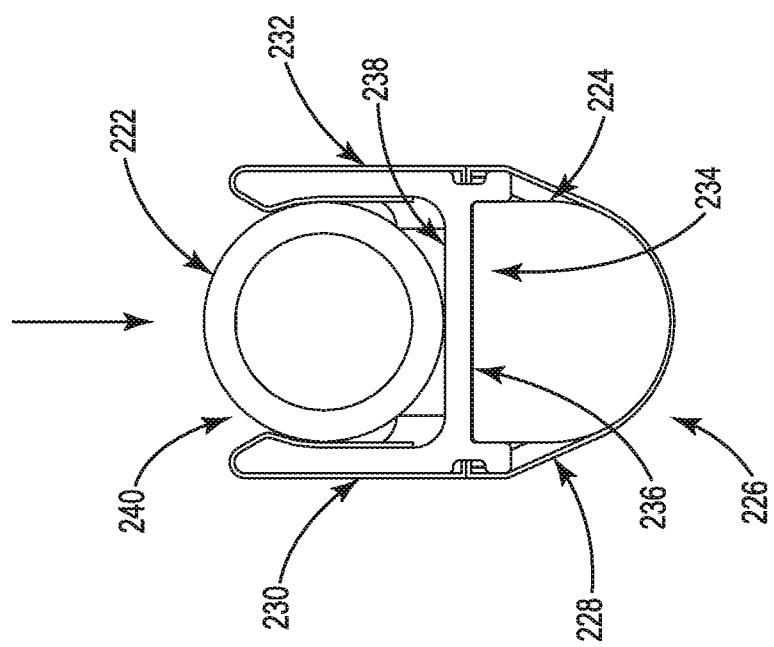

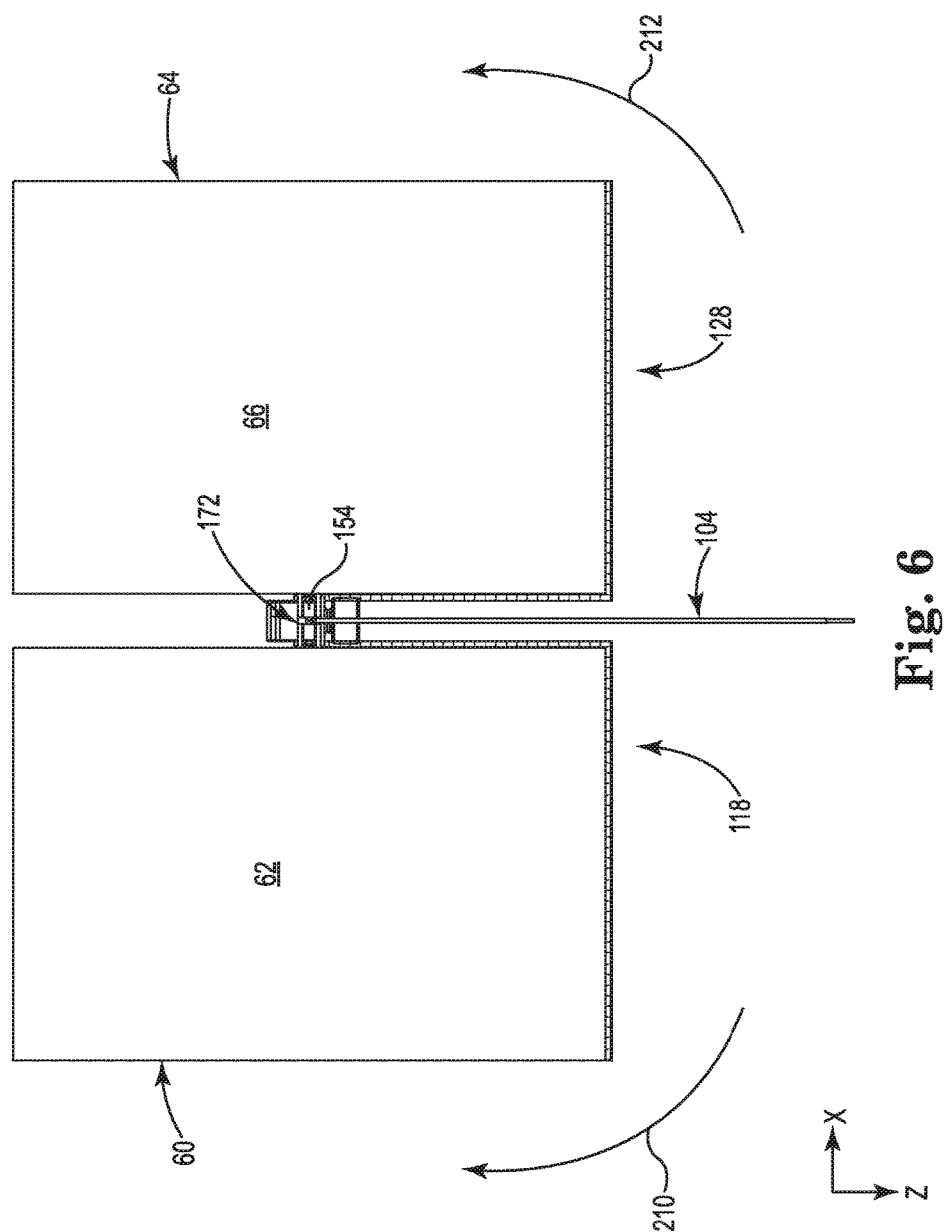

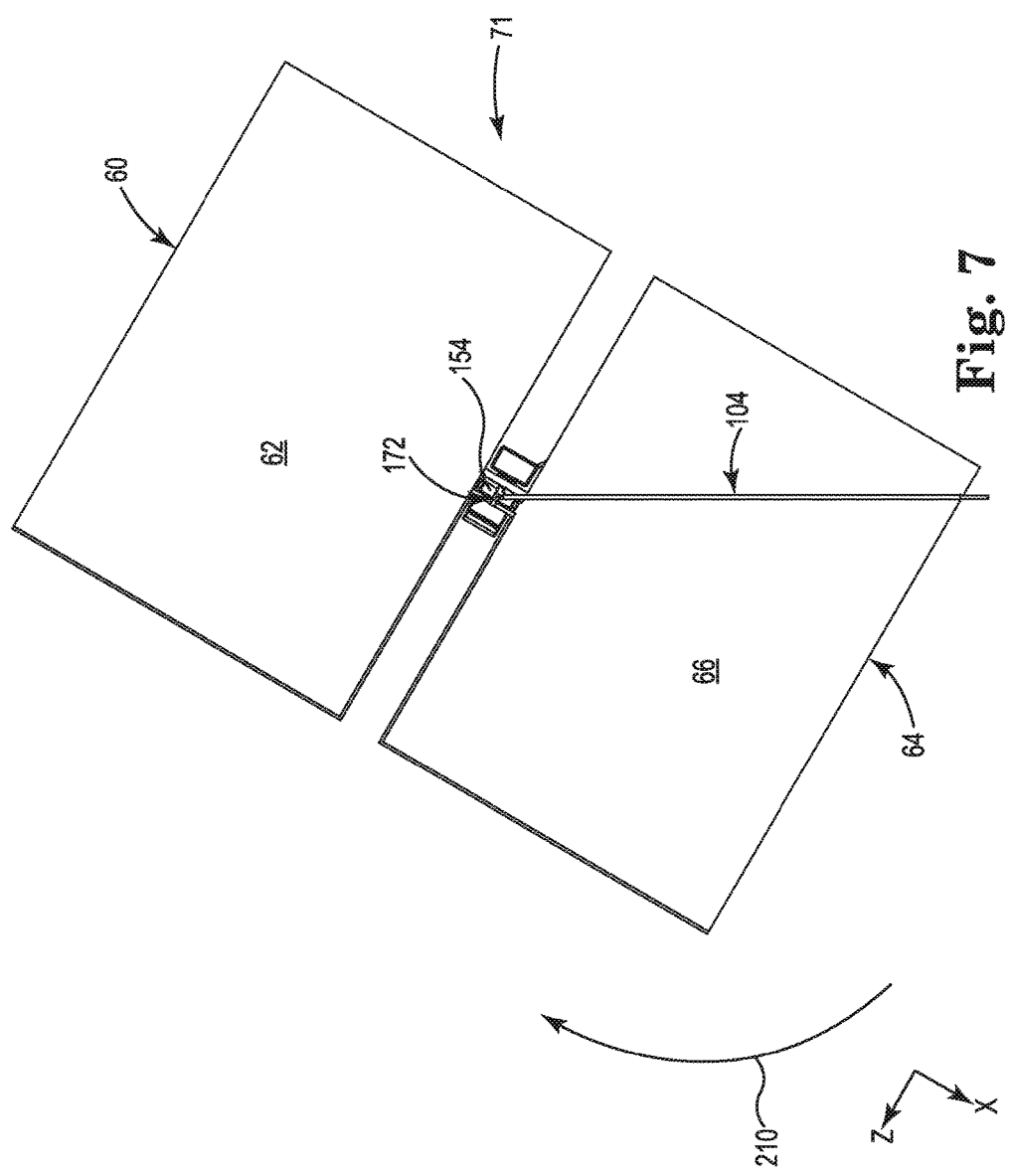

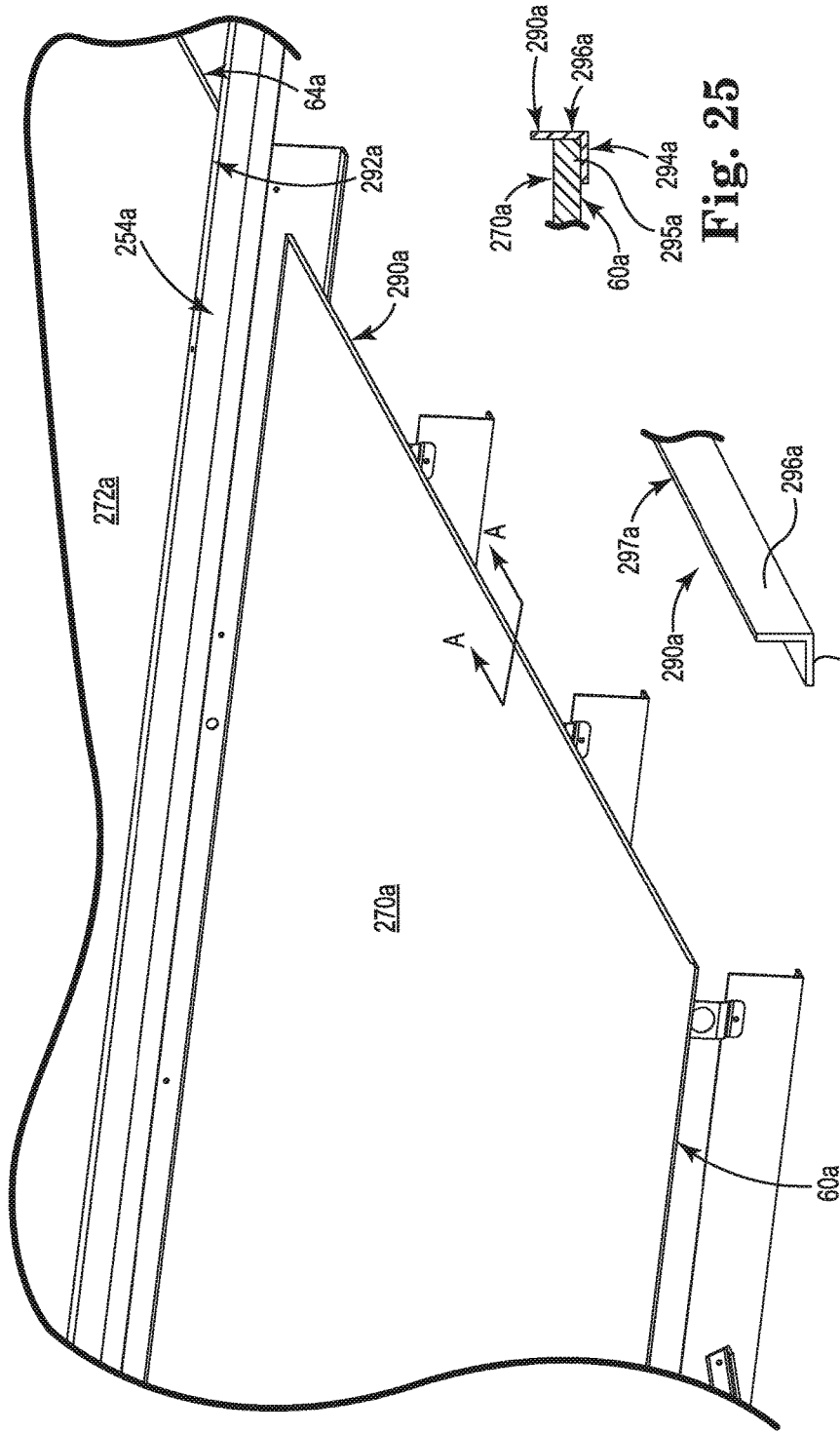

SYSTEM AND METHOD FOR CLEANING SURFACES

BACKGROUND

A type of solar energy plant has emerged to compete with photovoltaic (PV) systems. PV systems can only generate power when the sun is shining. More recently, battery systems are being developed to allow PV systems to store excess energy for use when the plant is not generating electricity.

Concentrated Solar Power (CSP), or CSP technology heats a liquid circulating in the tubes of a heat exchanger called a collector, located on a tower using 2 axis controlled mirrors that have a focal length sufficient to concentrate the sun's rays on the heat exchanger. These mirrors have a slight curvature to enable the sun to be focused and concentrated onto the heat exchanger.

The liquid circulating within the tubes of the heat exchanger can be any liquid that is capable of absorbing heat. CSP plants have been built that utilize molten salt, or ethylene glycol as heat transfer fluids. The heated fluid, typically around 1200° F., passes through a heat exchanger used to generate superheated steam. This steam product is used to drive turbines connected to generators for the production of electricity.

The system is sized to allow it to collect significantly more heat during daylight hours than the power generation system can use. The excess heated fluid may be stored after the sun goes down and power may be generated from the heat stored in the fluid during the overnight hours. CSP plants are able to generate better returns on the owner's investment because the plants run 24 hours/day, even though the towers only operate when the mirrors can collect the energy from the sun. CSP plants can also be constructed next to traditional power generating plants such as nuclear, coal and natural gas, which all utilize the same steam turbine system to generate power and used to supplement steam production to the plant.

CSP plants are steam generation operations. Other applications that require high volumes of steam like salt water desalination by distillation, petroleum processing, mining operations and hydroponic vegetable growing are all candidates for this green technology.

Since the inception of CSP, it has become important to develop ways to keep the mirrors clean in order to keep the plants running efficiently. In order to maximize the energy production from a CSP plant, it would be desirable to provide a system to keep the mirrors as free of dirt and other debris, that prevent the sun's energy from reaching the tower. Mirrors are a piece of glass with a reflective coating on the back side. Soiling occurs on the top side from natural sources at a rate of ½-1% loss in reflectivity per day. The sunlight has to pass through the soils on the surface, then back through the soils on its reflective path to the collector. Thus a double effect on the hindrance. Tower collector efficiency has a direct 1:1 correlation on the loss of efficiency. A 10% loss in reflectivity is a 10% loss in energy collected by the system.

Specialized equipment has been developed to collect the sun's rays. These collectors are referred to in the industry as heliostats. Heliostats are structures that incorporate one or more curved sheets of glass, and support the glass surfaces so that they can be rotated about a first vertical axis, and about a second horizontal axis, such that they can be positioned in a manner to optimize the collection of solar energy.

One known heliostat design is manufactured by Brightsource Corp., and can be found at www.brightsource.com. The base of the heliostat is positioned in a hole in the ground and is surrounded by earth or may be encased in concrete. The base portion is stationary. Attached to the base portion is a moveable upper portion that rotates about a central vertical axis Y of the base, and also rotates about horizontal axis X by means of a motor driven linear actuator. The glass surfaces, due to having a required focal length based on their distance from the tower, are not flat but have a slight concave profile.

During operation, the glass surfaces make slight movements on both axis' every 1-5 minutes to maintain their direction of sunlight to the collector.

When the plant is not collecting solar energy, the glass surfaces are stored in a substantially horizontal position to minimize wind shear and loads to the glass and heliostat structure.

Previous attempts to keep the mirror surfaces clean include mechanical wet washing systems, electrostatic non-contact systems and films and coatings. The wet washing systems require water, and energy to pump the water and run the equipment. The runoff water has adverse effects to the environment, which is typically dry desert areas. The water fosters the growth of vegetation, which may need to be removed periodically. The vegetation bring insects, the insects bring birds and birds bring excrement droppings on mirrors which inhibit reflectivity. Water in arid climates is a valuable resource that shouldn't be wasted.

Coatings seek to prevent dirt and dust from sticking in the first place, but have relatively short life due to the constant high exposure of UV radiation from the sun. Recoating is expensive which makes it a cost prohibitive solution.

Electrostatic systems keep the surface clear of particulate debris but fail to prevent or remove film soiling buildup which occurs from moisture and pollutants in the air coming in contact with the cooler glass surface.

For these and other reasons, there is a need for the present invention.

SUMMARY

One example provides a system for cleaning surfaces. The system includes an elongated blade configured to remove at least one of dirt, dust, debris and film from a smooth surface. A drive system is provided for causing the blade to contact the entire smooth surface, thereby removing at least a portion of at least one of dirt, dust, debris, and film. A cleaning device automatically cleans the blade before and after the blade is cleaning the smooth surface.

BRIEF DESCRIPTION OF THE DRAWINGS

The accompanying drawings are included to provide a further understanding of examples and are incorporated in and constitute a part of this specification. The drawings illustrate examples and together with the description serve to explain principles of examples. Other examples and many of the intended advantages of examples will be readily appreciated as they become better understood by reference to the following detailed description. The elements of the drawings are not necessarily to scale relative to each other. Like reference numerals designate corresponding similar parts.

FIG. 1 illustrates one example of a system for cleaning surfaces.

FIG. 2 illustrates one example of a heliostat including a mirror cleaning device.

FIG. 2A illustrates one example of a blade cleaning device.

FIG. 3 illustrates another view of the heliostat of FIG. 2.

FIG. 3A is a diagram illustrating one example of a heliostat in a safety position.

FIG. 3B is a diagram illustrating one example of a heliostat in a operating position.

FIG. 4 illustrates one example of a partial view of a cleaning mechanism.

FIG. 5 illustrates one example of a cross-sectional view of a cleaning mechanism.

FIG. 5A illustrates another example of a cleaning mechanism in an expanded view.

FIG. 5B illustrates one example of a cross-sectional view of the cleaning mechanism of FIG. 5A.

FIG. 6 illustrates one example of a cleaning operation of a heliostat in a first position of a cleaning cycle.

FIG. 7 illustrates another example of a cleaning operation of a heliostat in a second position of a cleaning cycle.

FIG. 21A illustrates one example of a heliostat blade retention device.

FIG. 24 is a partial perspective view illustrating one example of a heliostat including a blade cleaning device.

FIG. 25 is a partial view further illustrating one example of the blade cleaning device of FIG. 24.

FIG. 26 is a partial view further illustrating one example of the blade cleaning device of FIG. 24.

DETAILED DESCRIPTION

Figure 8:
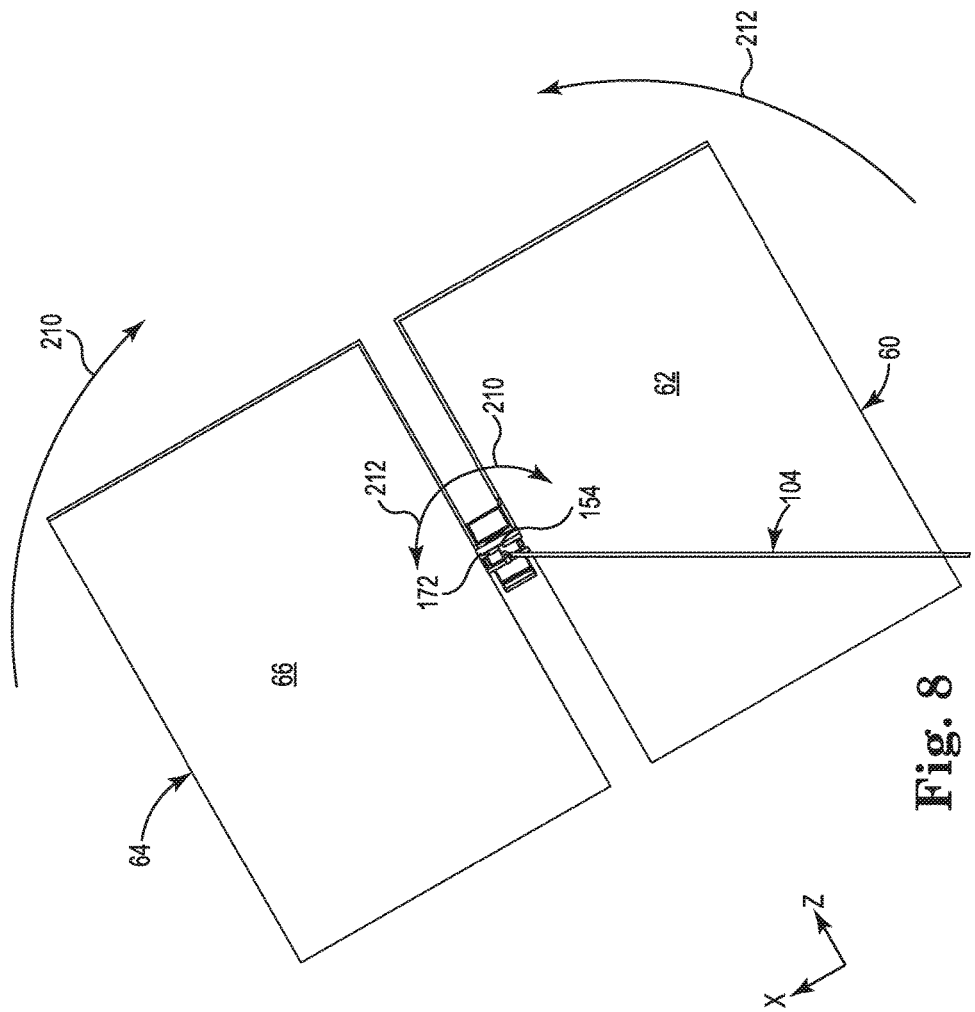
FIG. 8 illustrates another example of a cleaning operation of a heliostat in a third position of a cleaning cycle.

In the following Detailed Description, reference is made to the accompanying drawings, which form a part hereof, and in which is shown by way of illustration specific examples in which the disclosure may be practiced. In this regard, directional terminology, such as "top," "bottom," "front," "back," "leading," "trailing," etc., is used with reference to the orientation of the Figure(s) being described. Because components of examples can be positioned in a number of different orientations, the directional terminology is used for purposes of illustration and is in no way limiting. It is to be understood that other examples may be utilized and structural or logical changes may be made without departing from the scope of the present disclosure. The following detailed description, therefore, is not to be taken in a limiting sense, and the scope of the present disclosure is defined by the appended claims.

It is to be understood that the features of the various examples described herein may be combined with each other, unless specifically noted otherwise.

As used herein, the term "coupled" is not meant to mean that the elements must be directly coupled together and intervening elements may be provided between the "coupled" elements.

A system suitable for cleaning heliostats has been developed to mechanically wipe dirt and debris off of the glass surfaces. In one example, the system advantageously cleans the surfaces of the heliostat mirrors when the mirrors are in an overnight safe storage position, and after the CSP plant has stopped collecting energy for the day, eliminating the need to reduce the plant capacity from taking heliostats offline to clean mirrors.

In one example, the system is fully automated, eliminating the need for an attendant to initiate a cleaning cycle or monitor operation. The system is fully driven by the existing drive mechanism that is already present on the heliostat. In other examples, a separate drive system is utilized for the cleaning operation.

FIG. 1 illustrates one example of a cleaning system generally at 10. The cleaning system 10 includes an elongated blade 12 configured to remove at least one of dirt, dust, debris or film from a smooth surface 14. A drive system 16 is provided for causing the blade 12 to contact the entire smooth surface 14, thereby removing at least a portion of at least one of dirt, dust, debris and film. A cleaning device 18 is provided for automatically cleaning the blade 12 before and after the blade 12 cleans the smooth surface 14.

In one example, the system is a heliostat and the smooth surface is a mirror or mirror surface, as part of a concentrated solar plant. In another example, the system is a solar panel system (e.g., a photovoltaic system) and the smooth surface is a solar panel, as part of a solar field.

FIG. 2 illustrates one example of a heliostat generally at 50, suitable for use in a concentrated solar plant. A mechanical cleaning mechanism 100 is incorporated into the heliostat 50. The heliostat 50 includes a first mirror 60 having a first mirror surface 62 and a second mirror 64 having a second mirror surface 66. In one example, first mirror 60 and second mirror 62 are rectangular shaped mirror panels that are uniformly spaced apart on the heliostat 50.

The first mirror 60 and second mirror 64 are rotatably and movably coupled to mirror support structure 70 (partially shown). Heliostat 50 is illustrated in a resting or safety position. In one example, in the safety position first mirror surface 62 and second mirror surface 66 are substantially horizontal relative to an installation surface 68 (e.g., a field plane or ground). Typically, heliostat mirrors are moved to a safety position during non-daylight hours. In the safety position, exposure to wind loads and other external forces are minimized. The mirror safety position will be described in greater detail later in this specification.

In one example, cleaning mechanism 100 operates to clean mirror surface 62 and mirror surface 66 when the heliostat is in a safety position. In other examples cleaning mechanism 100 is suitable to clean the mirror surfaces 62 and 66 when in a position other than a safety position.

In one or more examples, the cleaning mechanism used to clean a mirror surface includes a blade. As used herein, the term blade can refer to a longitudinally extending member that may have a relatively thin or wide contact area with a mirror surface. In other embodiments, the cleaning mechanism that may or may not include a blade may include a member having a variety of shapes or sizes that come in contact with a mirror surface for cleaning the surface. Further, the blade cleaning device described herein may be used to clean all different shapes and sizes of cleaning mechanisms.

In one example, cleaning mechanism 100 includes a blade 104 and a support arm 106. Cleaning mechanism 100 is coupled to mirror support structure 70. In one example, blade 104 is an elongated member that extends longitudinally and radially from a heliostat central axis z. Central axis z extends through the mirror support structure 70, and is generally orthogonal to the mirror surfaces 62, 66 when they are in the safety position. During a cleaning operation of the mirror surfaces 62, 66, the mirror surfaces 62, 66 rotate about the central axis z relative to the blade 104 (indicated by rotational arrow 72). In one example, during a cleaning operation the blade 104 remains stationary relative to the mirror support structure 70, while the mirrors 60, 64 rotate (about the central axis z) beneath the blade 104. In another example, blade 104 rotates relative the mirror support structure 70 and the mirrors 60 and 64 remain stationary. In one example, during a cleaning operation mirrors 60 and 64 rotate in a first direction 72, and then rotate in a second, opposite direction 74.

A drive system (not shown) operates to move the mirror surfaces 62 and 66 relative to the cleaning mechanism 100, removing material from the mirror surfaces 62 and 66. In one example, the material includes at least one of dirt, dust, debris and film. In one example, the drive system is the same drive system that operates to rotate the mirrors during daylight hours when the mirrors are in a position other than a safety position. A more detailed description of the drive system is provided later in the specification.

Blade 104 has a flexible surface that conforms to the height of the glass surface as the surface moves beneath the blade. In one example, mirror surface 62 and mirror surface 66 are not flat, but are slightly concave. The concave shape aids in tracking the position of the sun relative to a CSP power tower. Blade 104 includes a flexible elongated surface that conforms to the height of the concave glass surfaces 62, 66. Since the glass surfaces are not flat, the distance between the support structure of the blade and the surface of the mirror surface varies over the course of a cleaning cycle. During a cleaning cycle, blade 104 is in cleaning contact with first mirror surface 62 and second mirror surface 66. In one example, the cleaning contact is a frictional contact.

During non-daylight hours mirrors 60 and 64 are brought to a safety position. In one example, a mirror surface cleaning operation is conducted while the mirrors are in the safety position. During the cleaning operation the glass surfaces 62 and 66 rotate about central axis Z 360 degrees (indicated by rotational arrow 72) then change direction and rotate another 360 degrees in an opposite direction (indicated by rotational arrow 74) to complete a full cleaning cycle. One or more full or partial cleaning cycles may be completed while the mirrors 60 and 64 are in a safety position.

Heliostat 50 further includes a blade cleaning device 108. When blade 104 cleans unwanted material from mirror surfaces 62 and 64, at least some of the unwanted material will remain on the blade 104. In one example, blade cleaning device 108 automatically cleans the blade 104 before and after blade 104 cleans mirror surfaces 62 and 66. In reference also to FIG. 2A, in one example blade cleaning device 108 includes a brush positioned near the mirror surfaces 62 and 66 for removing unwanted material from the blade 104 after the blade 104 moves across (or relative to) a mirror surface.

Blade cleaning device 108 can be positioned along one or more edges of first mirror 60 and second mirror 64. In one example, blade cleaning device 108 is located along two edges of first mirror 60 and two edges of second mirror 64. Mirror 60 includes a first edge 110, second edge 112, and third edge 114 and a fourth edge 116. Blade cleaning device 108 includes first mirror brush 118 positioned along first edge 110 and at least partially along second edge 112. In a similar manner, second mirror 64 includes first edge 120, second edge 122, third edge 124 and fourth edge 126. Blade cleaning device 108 includes a second mirror brush 128 located along first edge 120 and at least partially along second edge 122. In reference also to FIG. 2A, in one example the blade cleaning device includes a first mirror brush including brush members that extend above the mirror surface 62. When the first mirror blade 104 is in cleaning contact with the mirror surfaces 62 and 66, upwardly extending brushes 102 mounted to the mirror structure on two sides of each mirror surface 62 and 66 function to clean the blades before and after each cleaning cycle. In other examples, blade cleaning device includes other types of material (e.g., an abrasive material) for cleaning unwanted material from blade 104.

FIG. 3 illustrates one example of a side elevation view of a heliostat 50 including a cleaning device 18. Heliostat 50 includes a drive system 140 and controller 170. The drive system 140 operates to move the heliostat 50 between a safety position 142, where the heliostat mirrors are substantially parallel to a field plane 68, and an operating position. In the operating position, drive system 140 moves and rotates the heliostat mirrors to track the position of the sun relative to a central CSP collection tower.

In one example, the drive system 140 includes a first drive 150 and a second drive 152. First drive 150 operates to rotate the mirrors 60 and 64 about a first (substantially vertical) axis 154, indicated by rotational arrow 156. In one example, first drive 150 is termed an azimuth drive, and can rotate mirrors 60 and 64 up to 360 degrees about axis 154. Second drive 152 operates to rotate the mirrors 60 and 64 about a second (substantially horizontal) axis 158 (as illustrated, into the page), indicated by rotational arrow 160. In one example, second drive 152 is termed an elevation drive and is capable of rotating mirrors 60 and 64 through a range of degrees about axis 158. In one example, the range is between 0 degrees and 90 degrees. In one example, first drive 150 and second drive 152 are worm drives.

Reference is also made to FIG. 3A and FIG. 3B. FIG. 3A is a schematic diagram of heliostat 50 in a safety position at 162, with mirrors 60 and 64 in a horizontal position substantially parallel to a field plane 68. Second drive 152 operates to move the heliostat 50 into a safety position and out of a safety position, illustrated by rotational arrow 163. Once in the safety position, first drive 150 operates to rotate the mirrors 60 and 64 about central axis 154 during a mirror cleaning operation, indicated by rotational arrow 164. FIG. 3B is a schematic diagram of heliostat system 50 in an operating position 166. Both first drive 150 and second drive 152 operate to maximize the position of mirrors 60 and 64 relative to a daytime position of the sun and a CSP central collection tower, illustrated by rotational arrows 167 and 168.

Controller 170 controls the operation of first drive 150 and second drive 152, operating them to move the mirrors 60 and 64 to the safety position 162 and during the operating position 166. Further, controller 170 operates the first drive 150 to rotate mirrors 60 and 64 about central axis 154 during a mirror cleaning operation.

In reference to cleaning device 18, blade 104 extends radially from a central shaft 116 and is pivotally mounted to the central shaft 172 at a first end 174. Blade 104 is supported by a support arm 106 at second end 176 (See also FIG. 4). Support arm 106 has a first end 178 that rests in a saddle 180. Saddle 180 is fixedly mounted to the heliostat support 182. In one example, heliostat support 182 is positioned in the ground 68 and anchored by soil, concrete or other support material. During a mirror cleaning operation and when the mirrors 60 and 64 are in a safety position, the support arm first end 178 is positioned in saddle 180. When mirrors 60 and 64 are moved to an operational position, second drive 152 first rotates and tilts the mirrors 60 and 64 upward, releasing the support arm first end 178 from the saddle 180. The mirrors 60 and 64 can now be tilted as desired during the operational mode without interfering or being restricted by the cleaning device 18.

Reference is also made to FIG. 4. FIG. 4 illustrates one example of a portion of cleaning device 18 in a heliostat 50. The distal second end 176 of the blade 104 is supported by the support arm 106. Support arm 106 includes a substantially straight portion 184 extending between first end 178 and a second end 186, and further includes a curved portion 188 at second end 186. The curved portion first end 190 is coupled to straight portion 184, and the curved portion second end 192 is coupled to blade 104 at the distal second end 176. In one example, second end 192 is inserted into the blade 104 second end 176. In other examples, support arm 106 may include other shapes to couple to blade 104 in the same or other manners.

In one example, blade 104 includes a substantially rigid support structure 194. In one example, the substantially rigid support structure 194 includes rigid tubing that extends through a length of blade 104. In one example, the support structure 194 has a square or rectangular shaped cross-section. Support arm 106 second end 192 is inserted into an opening of the rectangular shaped rigid tubing. In other examples, the support structure has other formations and shapes, such as being formed from round tube stock, channel stock or a custom profile extrusion.

Referring also to FIG. 5, one example of a cross-section of blade 104 is illustrated. The support structure 194 of the blade is spaced above the mirror surface 62. Surrounding the support structure 194 is a flexible or cushioning layer 196. In one example, the cushioning layer 196 is made of a foam material, such as a pipe foam insulation. An example of suitable foam material is an extruded foam rubber and may be purchased from a home improvement store. The cushioning layer 196 may be positioned about support structure 194 such that there is an airspace 198 between the support structure 194 and cushioning layer 196. The airspace 198 provides for more flexibility in cushioning layer 196, providing a surface flatness compensating ability for the blade 104 with respect to a mirror surface. Since the mirror surface may not be flat (e.g., in one example it is concave), the cushioning layer 196 in combination with airspace 198 helps the blade 104 to accommodate for varying distances 130 between the mirror surface 60 and the lower surface of the support arm 194 during operation (See also FIG. 4). In other examples, the airspace 198 may alternatively be filled with other flexible materials, such as a tubular foam core of a different flexibility to obtain a desired effect of the cushioning layer.

Referring again to FIG. 5, the blade 104 has an outer soft abrasive layer 200 that is capable of scrubbing unwanted material or particles on (e.g., adhered to) the mirror surfaces 62 and 66, off of the surface by mechanical contact pressure, friction, and movement across the mirror surfaces. The outer layer 200 is soft enough to flex as the blade 104 travels over the mirror, but have an abrasive quality for removal of unwanted material. Further, the material is not so abrasive as to damage the mirror surface 62. One example material suitable for cleaning particulate debris as well as film removal from the glass surfaces 62 is a suede material. In one example, the suede material is a synthetic suede material also known as ecsaine. The material advantageously remains flexible when exposed to outdoor conditions, including direct sunlight, wind and rain. When the material gets wet, it does not stiffen and lose its flexibility. In one example, the material is marketed under the trade name Ultrasuede. Examples of material suitable for use for soft abrasive layer 200 is described in detail later in this specification.

In one example, the outer soft abrasive layer 200 is attached to the blade 104 by means of a seam 202 that is formed with an adhesive suitable for gluing leather or suede. The seam 202 may also be hand stitched, machine stitched or held together using another known method of joining together two edges of a fabric. The fabric may also be secured to tube 194 by a mechanical means such as a clip retainer.

FIGS. 5A and 5B illustrate another example of a blade, indicated as blade 104a. Blade 104a functions similar to the blade 104 previously described herein. FIG. 5A is an exploded view illustrating another example of a blade, indicated as blade 104a. Blade 104a includes a number of longitudinally extending members, including a blade frame 220, a structural member 222, a foam member 224, and an outer layer 226. In one example, blade frame 220 provides a central frame for the other longitudinally extending members, and is made of an aluminum extrusion. In other embodiments, blade frame 220 is made of other suitable materials for providing a central frame, such as an extruded polymer. Structural member 222 is a generally stiff member that provides structural support to the blade 104a when assembled, and aids in retaining outer layer 226. In one example, structural member 222 is a tubular shaped member made of steel. Foam member 224 provides flexibility to the blade 104a when it contacts a surface for cleaning. In one example, the foam member 224 is an extruded foam rubber.

Outer layer 226 can be similar to the outer layers previously described herein, suitable for contacting and cleaning a surface. In one example, outer layer 226 is made of multiple pieces, including a surface contact piece 228 and a first side piece 230 and a second side piece 232. The surface contact piece 228 is made of a soft abrasive material similar to soft abrasive layer 200, and comes in contact with a surface to be cleaned during a cleaning operation. Surface contact piece 228 is positioned between first side piece 230 and second side piece 232. In one example, first side piece 230 and second side piece 232 are made of a fabric material. In one aspect, the fabric material is a nylon mesh fabric or a cotton duck fabric. With this combination of materials, first side piece 230 and second side piece 232 can be attained at a much lower cost than surface contact piece 232 while maintaining the integrity and functionality of the outer layer 226.

FIG. 5B illustrates one example of an end view of assembled blade 104a. In an assembled, operational position, blade frame 220 includes a back side 234 having a first channel 236 and a front side 238 having a second channel 240. Foam member 224 is positioned against back side 234 in the first channel 236, and retained in place via outer layer 226. Outer layer 226 is positioned about foam member 224 and the outside of the sides that form the second channel 240. Structural member 222 functions to securely retain the outer layer 226 about the outside of blade 104a. In one example, structural member 222 is press fit into the second channel 240 of blade frame 220 (indicated by arrow 242) to securely retain outer layer 222 in place. In one example, surface contact piece 228 is centered on foam member 224 to operate as a cleaning surface during a cleaning operation. First side piece 230 and second side piece 232 cooperate with structural member 222 when it is press fit into second channel 240 to retain and maintain outer layer 226 and more importantly surface contact piece 228 in an operational position.

In one example, the blade outer layers that contact a surface to be cleaned, such as outer layer 200 and outer layer 226 surface contact piece 228, are made of a synthetic material. The synthetic material, in one example, is a microfiber material that can be a nonwoven material. In one example, the outer layer is made of a combination of materials, such as a composite synthetic material made of a nonwoven fabric and an elastomer.

In one example, the outer layer is made of a synthetic microfiber nonwoven material known as an ecsaine fabric. In one example, the ecsaine fabric is available under the trade name Ultrasuede. In another example, the outer material is a material that is also an artificial substitute for suede. Another known example is available under the trade name Alcantara. In other examples, the outer layer is a composite material having similar characteristics, such as a polyester and polyurethane composite material.

In other examples, the outer layer is made of other materials that provide a desirable function for cleaning a glass surface without damaging the surface. For example, the blade may include a material such as a rubber or polymer material that contacts a cleaning surface.

Referring again to FIG. 4, in order to keep the blade 104 free of debris and dirt and capable of cleaning, blade cleaning device 108 is fixedly mounted onto two sides of each mirror structure. In one example, the blade cleaning device 108 is an elongated brush 204. The brush 204 has a plurality of upwardly extending brush fiber bundles 206 having tips 208 that are higher in elevation than the lowest point 140 of the blade before the blade passes over the surface 62 and is deformed. The brushing action against a portion of the blade that contacts the glass surface 62 removes the unwanted material, such as soils, from the fibers of the abrasive, outer layer 200, restoring the cleaning ability of the layer 200. Referring also to FIG. 2, the brushes 102 extend along about half of the long side and along an entire short side of each mirror in order for the blade 104 to be completely cleaned along its length near the beginning and then again near the end of each rotation.

FIGS. 6-8 illustrate one example of a cleaning operation of heliostat 50. Reference is also made to the Figures previously described herein. During a cleaning operation, mirrors 60 and 64 are moved (e.g., rotated) relative to the blade 104. In one example, the blade 104 remains stationary while the mirrors 60 and 64 rotate about shaft 172. In other examples, the blade 104 may be moved while the mirrors 60 and 64 remain stationary. In one example cleaning operation, the mirrors 60 and 64 are moved to a safety position. In the safety position, mirrors 60 and 64 are substantially horizontal to a field plane (e.g., the ground). The mirrors 60 and 64 rotate 360 degrees in a first direction, indicated by rotational arrow 210, about axis 154. Next, the mirrors are rotated 360 degrees in a second, opposite direction about central axis 154. In this example cleaning operation, the blade 104 contacts and cleans the mirror surfaces 62 and 66 twice in one cleaning cycle.

FIG. 6 illustrates the rotating portion of the heliostat 50 in a resting position, prior to a first rotation. Heliostat 50 is capable of rotating in a first rotation direction 210 and a second, opposite rotation direction 212. As illustrated in FIG. 7, the upper portion of the heliostat 50 rotates in a clockwise fashion as illustrated by rotational arrow 210. As illustrated in FIG. 8, the mirrors 60 and 64 continue to rotate in a first direction until the mirrors 60 and 64 rotate a complete 360 degrees and return to their original, resting position (as illustrated in FIG. 6). Once the original position is reached, the mirrors 60 and 64 reverse direction and rotate 360 degrees in the opposite direction, indicated by rotational arrow 212. The mirrors rotate until they again reach their original, resting position to complete a cleaning cycle.

In other examples, mirrors 60 and 64 rotate according to other desired cleaning cycles. For example, the mirrors 60 and 64 may only rotate 360 degrees in one direction for a complete cleaning cycle. In another example, the mirrors 60 and 64 may rotate 180 degrees in a first direction, then rotate 180 degrees in an opposite, second direction. In another example, the mirrors 60 and 64 may complete a first cleaning cycle upon moving to a safety, resting position. Then, the mirrors 60 and 64 may complete one or more additional cleaning cycles at a later time, such as just prior to moving from the safety position to an operational position (e.g., at the start of the next day).

Figure 9:
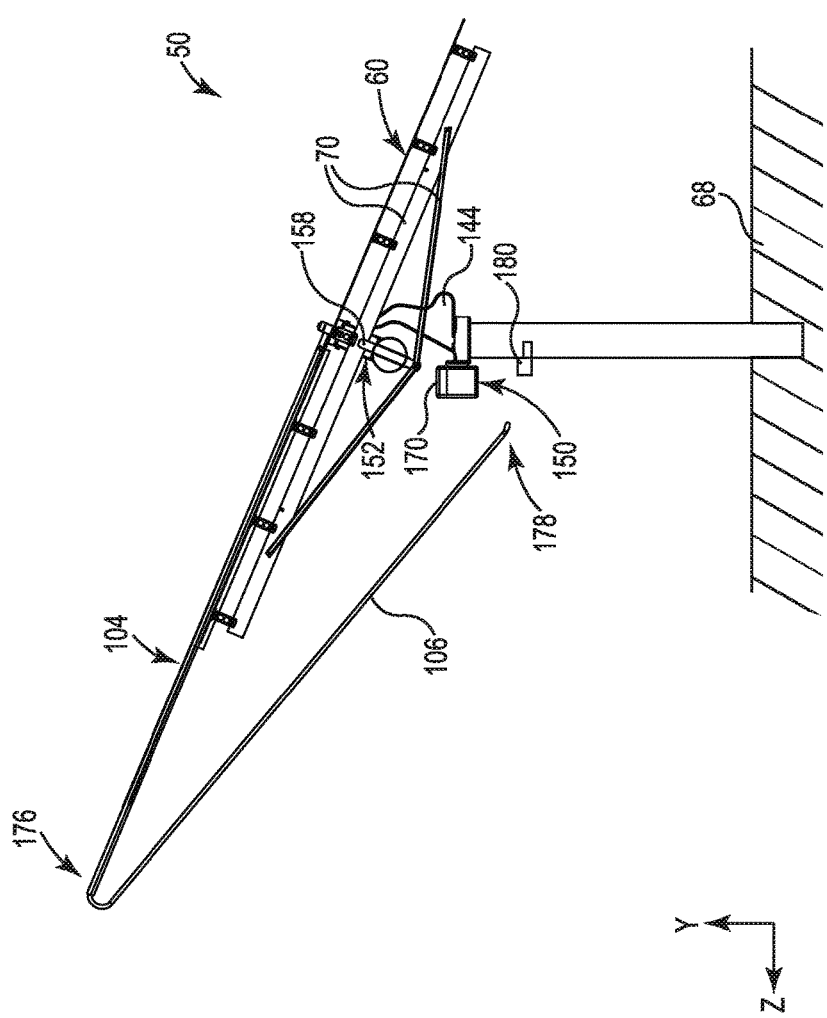
FIG. 9 illustrates another example of a heliostat in an operational position.

FIG. 9 illustrates one example of a heliostat 50 in an operational position. In the operational position, the heliostat 50 has begun rotation about a horizontal axis 158 (into the direction of the paper). As the support structure 70, including mirrors 60 and 64, rotate, the distal end 178 of the support arm 106 disengages from the saddle 180 during operation. In one example of the operational position illustrated, the blade 104 and support arm 106 remain fixed with respect to the heliostat mirrors 60 and 64, including when the heliostat is rotated and positioned to maximize reflection of solar energy to a CSP collection tower. It is the movement of the support structure 71 and mirrors 60 and 64 into their resting or "home" safety position, with the mirror surfaces 62 and 66 moving into a substantially horizontal plane relative to a field plane, that the support arm 106 engages saddle 180 and permits the control mechanism 170 of the heliostat to activate the gearbox, permitting the support structure 70 including mirrors 60 and 64 of the heliostat 50 to rotate about a vertical axis (relative to blade 104) and causing the cleaning to occur. See also, for example, prior FIG. 3.

Figure 10:
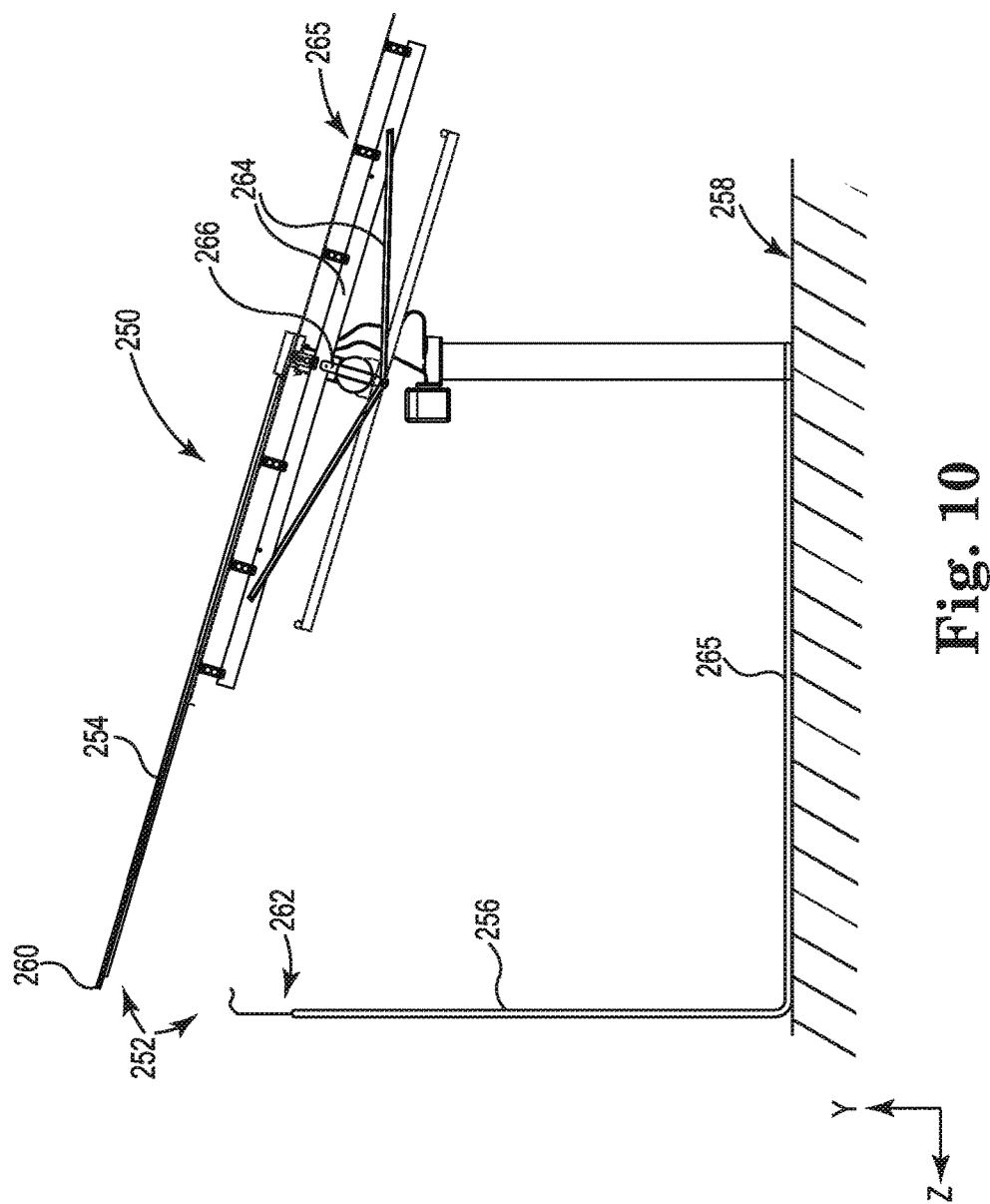
FIG. 10 illustrates another example of a heliostat including a surface cleaning device.
Figure 11:
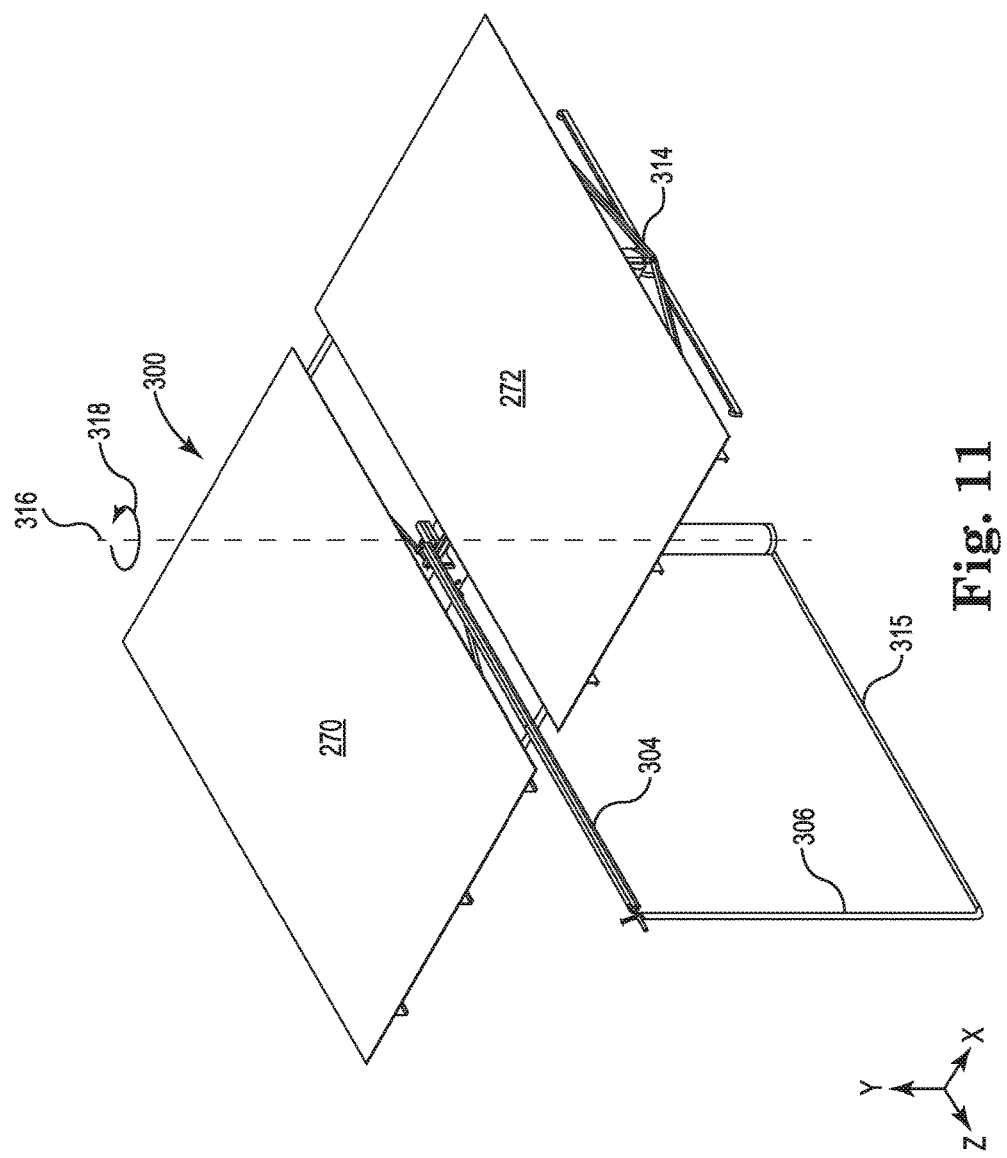
FIG. 11 illustrates one example of a perspective view of the heliostat of FIG. 10.

Cleaning systems such as the one described above may be modified. For example, as illustrated in FIG. 10, a heliostat 250 may have a cleaning system 252 that includes a cleaning blade 254 and a support arm 256. The support arm 256 rests on the field plane (e.g., ground) 258 and is detachable from the blade 254 at a distal end 260 of the blade 254, and the distal end of the support arm 262, respectively. When the frame 264, including mirrors 265, rotates about a horizontal axis 266 (into the paper) during energy collection, the blade 254 is disengaged and is fixed with respect to the frame 264. FIG. 11 illustrates one example of a perspective view of the heliostat 250 in a safety position, with a vertical support arm that has a portion 265 resting on the ground. The upper frame 264 of the heliostat 250 rotates about axis 266 in a first direction represented by rotational arrow 268 and then in an opposite direction, engaging blade 254 with the slightly curved (e.g., concave) mirror surfaces 270, 272 to remove unwanted material such as dust, dirt and debris.

Figure 12:
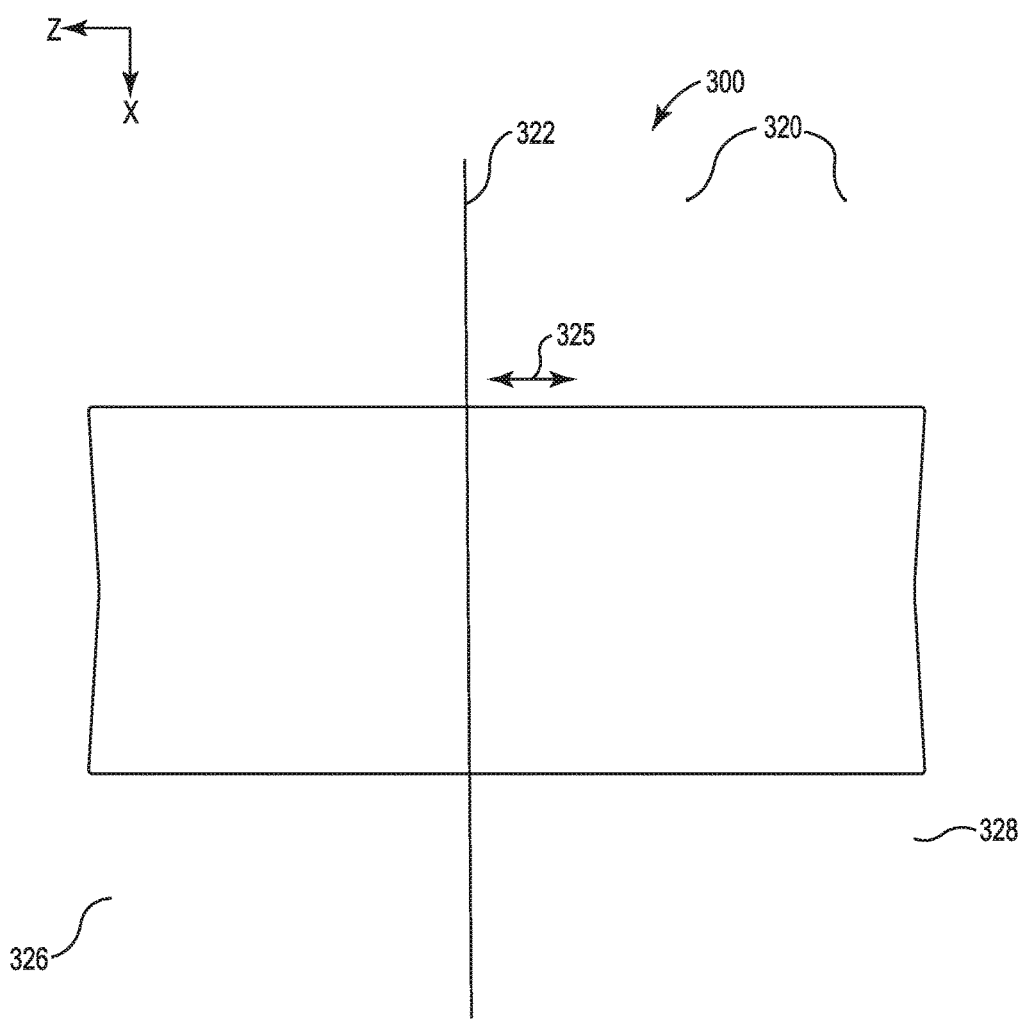
FIG. 12 illustrates another example of a heliostat.

In another example as illustrated in FIG. 12, the heliostat 300 has multiple mirror panels 320. When this system is in a storage position with the mirror panels 320 being substantially horizontal relative to a field plane (e.g., ground), because the device is much larger in size, the panels 320 are not at the same elevation, making it more difficult to clean all of the panels with a rotational cleaning device as previously described. In a second example, a blade 322 having the similar construction details as the blade illustrated in FIG. 4, is mounted for translation in a direction indicated by arrow 325. At each end 326, 328 of the panel frame, brushes are provided to clean the blade 322. In one example, the blade 322 is moved relative to a field plane, and the mirror panels 320 remain stationary during a cleaning cycle. In another example, the mirror panels are moved relative to the field plane and the blade 322 remains stationary during a cleaning cycle.

Figure 13:
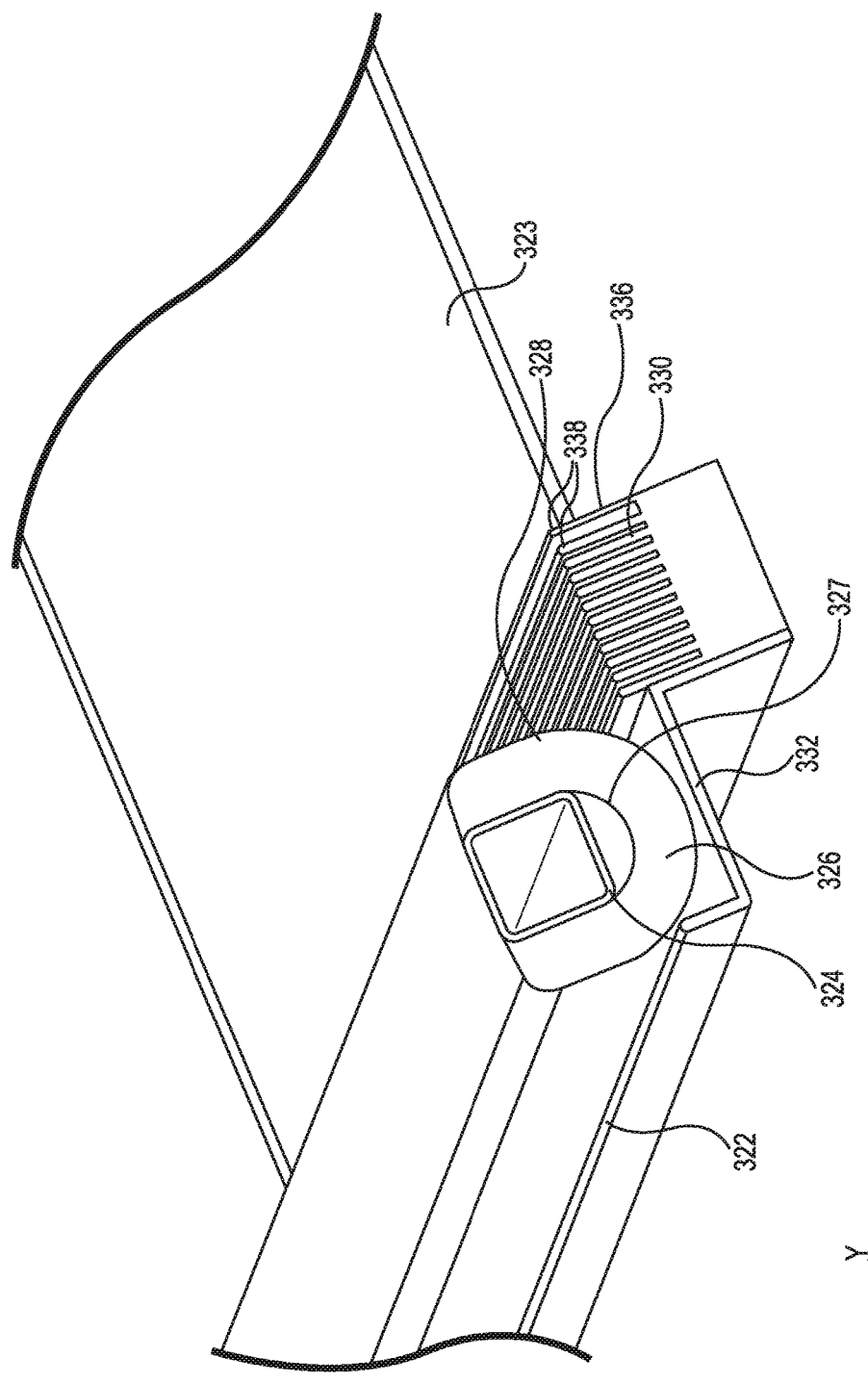
FIG. 13 illustrates another example of a heliostat including a cleaning mechanism and a blade cleaning system.

As illustrated in FIG. 13, the blade 322 is formed of square tubing 324 for rigidity and strength. A cushioning foam layer 326 surrounds the blade 322 on three sides. In one embodiment, an air space 327 is provided to allow the blade 322 to contact and mechanically clean surfaces 323 that vary in height over the cleaning cycle. An elongated brush 330 with fibers 336 that have upper tips 338 that have an elevation above a maximum height of the mirror surface 323 cleans the blade 322 after the blade leaves the storage channel 332 and traverses the mirror surface 323. The blade 322 is covered with an outer layer 328 that is formed from synthetic suede material in this example.

Figure 14:
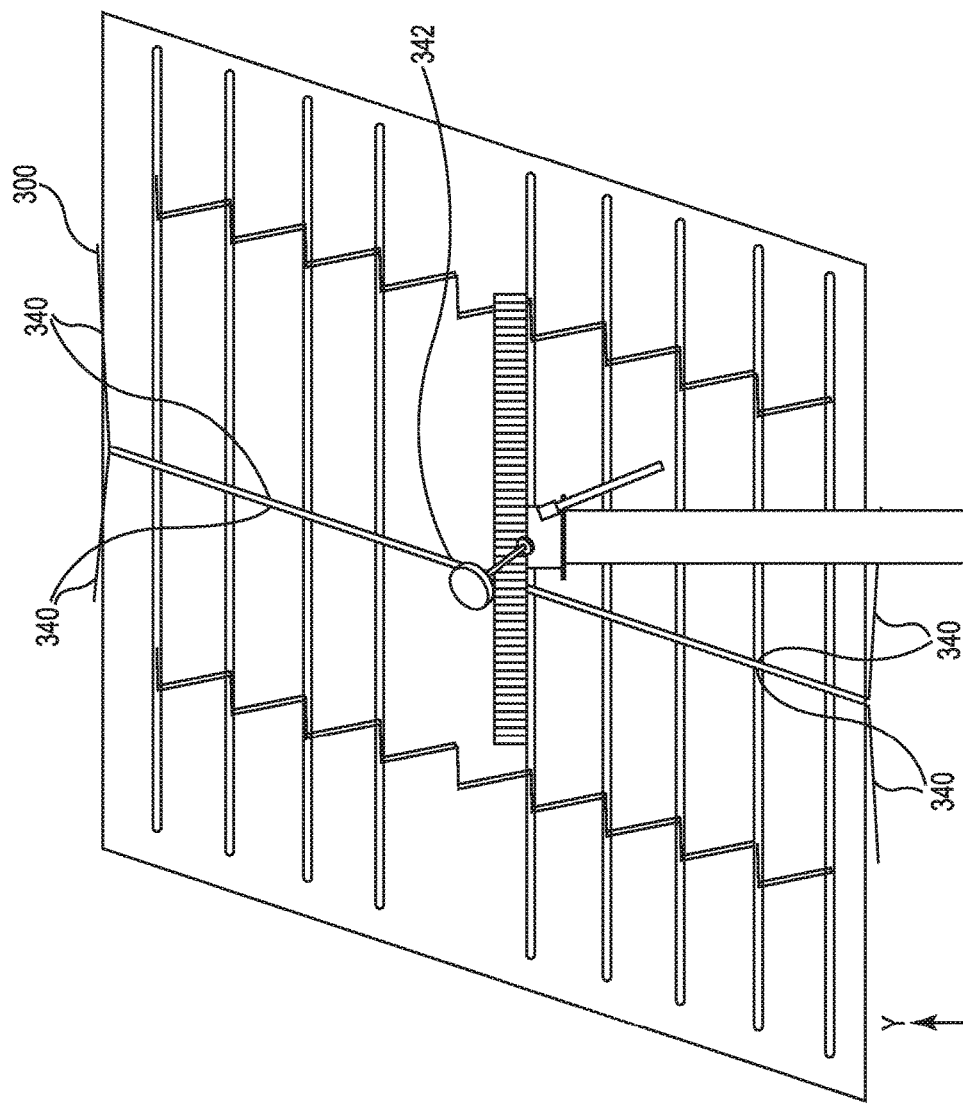
FIG. 14 illustrates one example of a heliostat.
Figure 15:
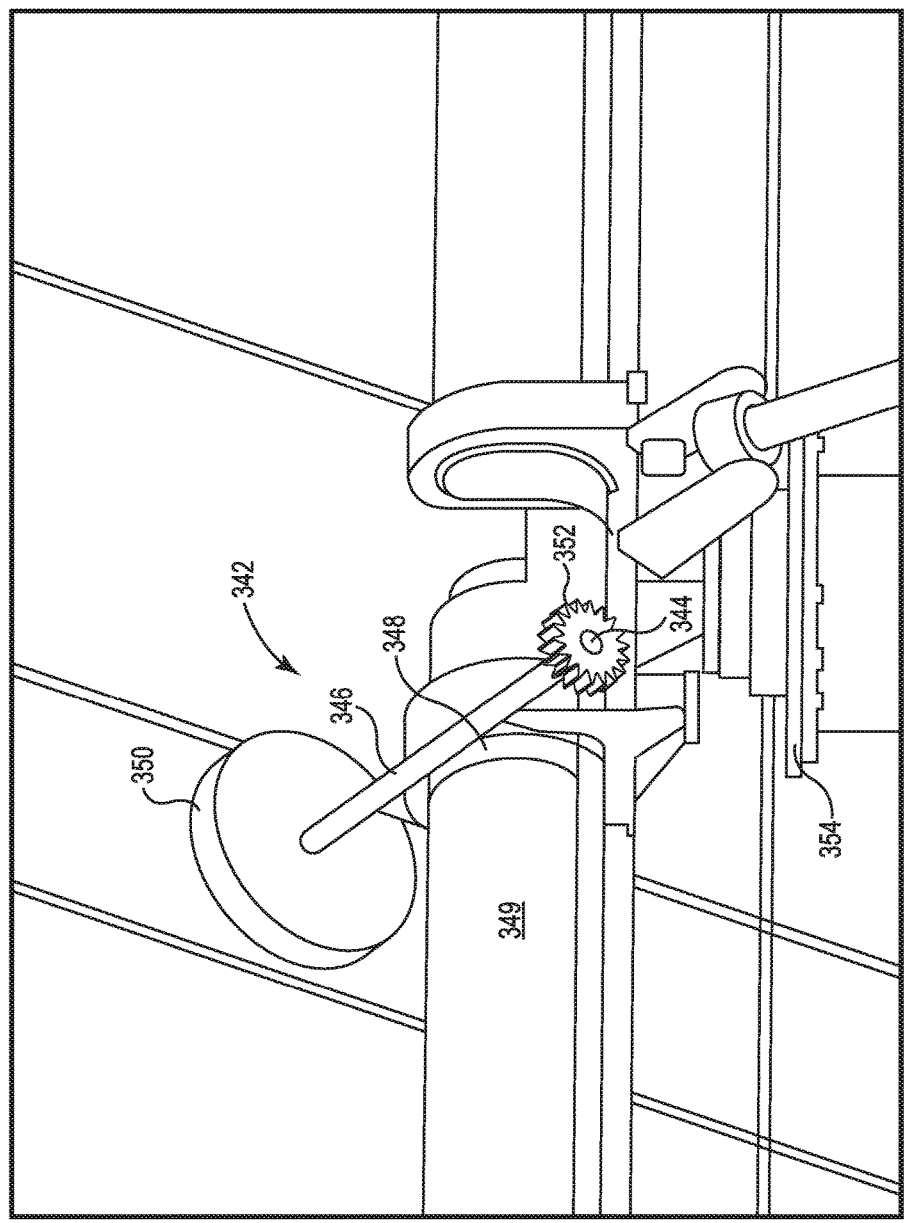
FIG. 15 illustrates one example of a heliostat.
Figure 16:
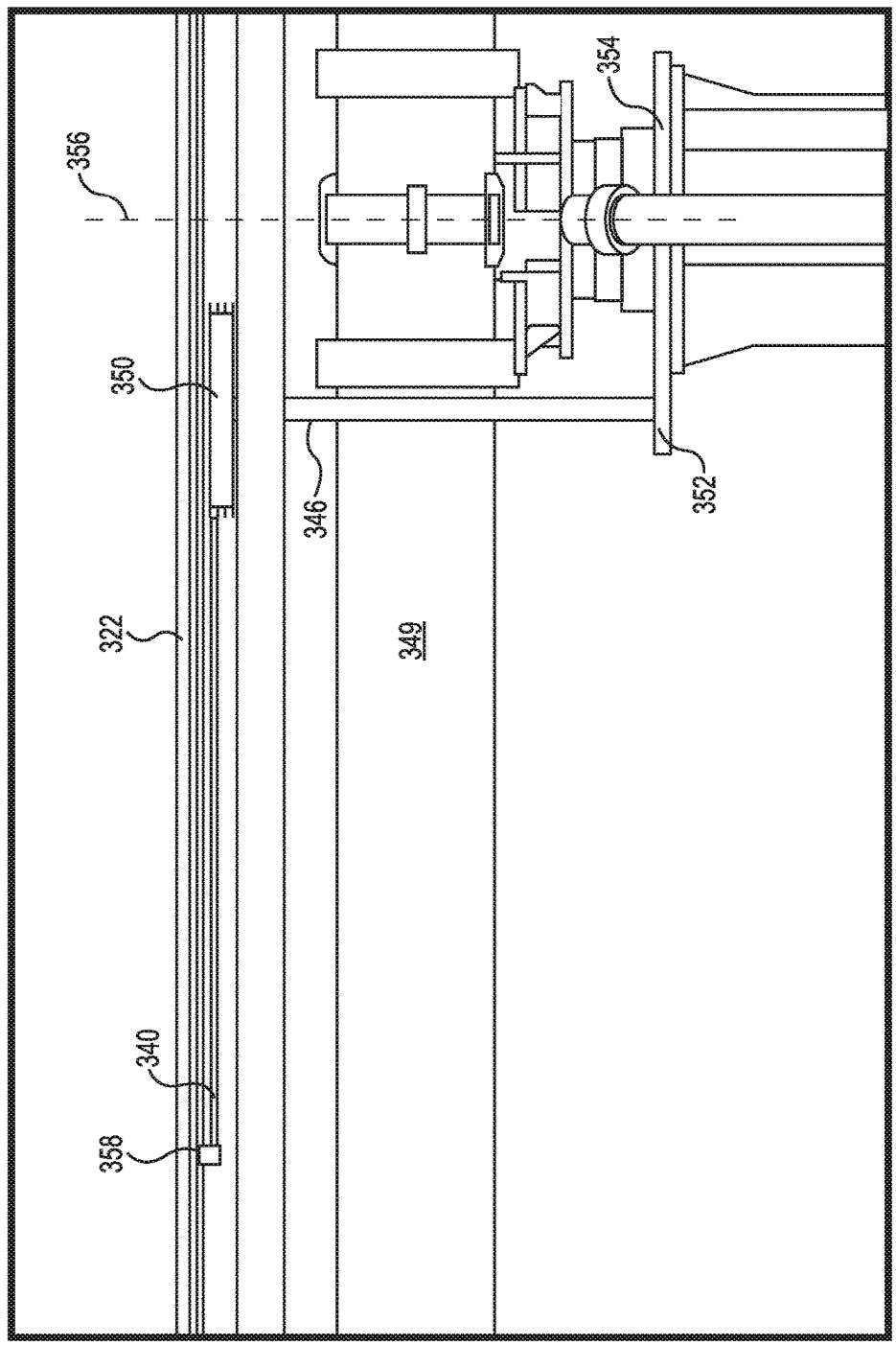
FIG. 16 illustrates one example of a heliostat.

FIG. 14 illustrates one example of a perspective view of heliostat 300 with a face rotated such that it is substantially vertical relative to a field plane. The underside of the support structure shows that a cable 340 and pulley system 342 cause the blade 322 to move linearly across the entire bank of mirror surfaces 320. The pulley system is illustrated in more detail in FIG. 15 and FIG. 16. The pulley system includes a shaft 344 that is rotationally mounted into sleeve 346. The sleeve 346 is fixed by means of a bracket 348 to the support structure 349 of the heliostat 300. At one end of the shaft 344 is a pulley 350 that engages cables 340. At an opposite end of shaft 344 is a gear 352 with teeth that mesh with ring gear 354 when the frame of the heliostat is rotated into its resting position, or when the mirror surfaces 320 are in a substantially horizontal position. The control box and gear motor (not shown) that cause the frame 349 to rotate about vertical axis 356, causing gear 352 to rotate about stationary gear 354.

Figure 17:
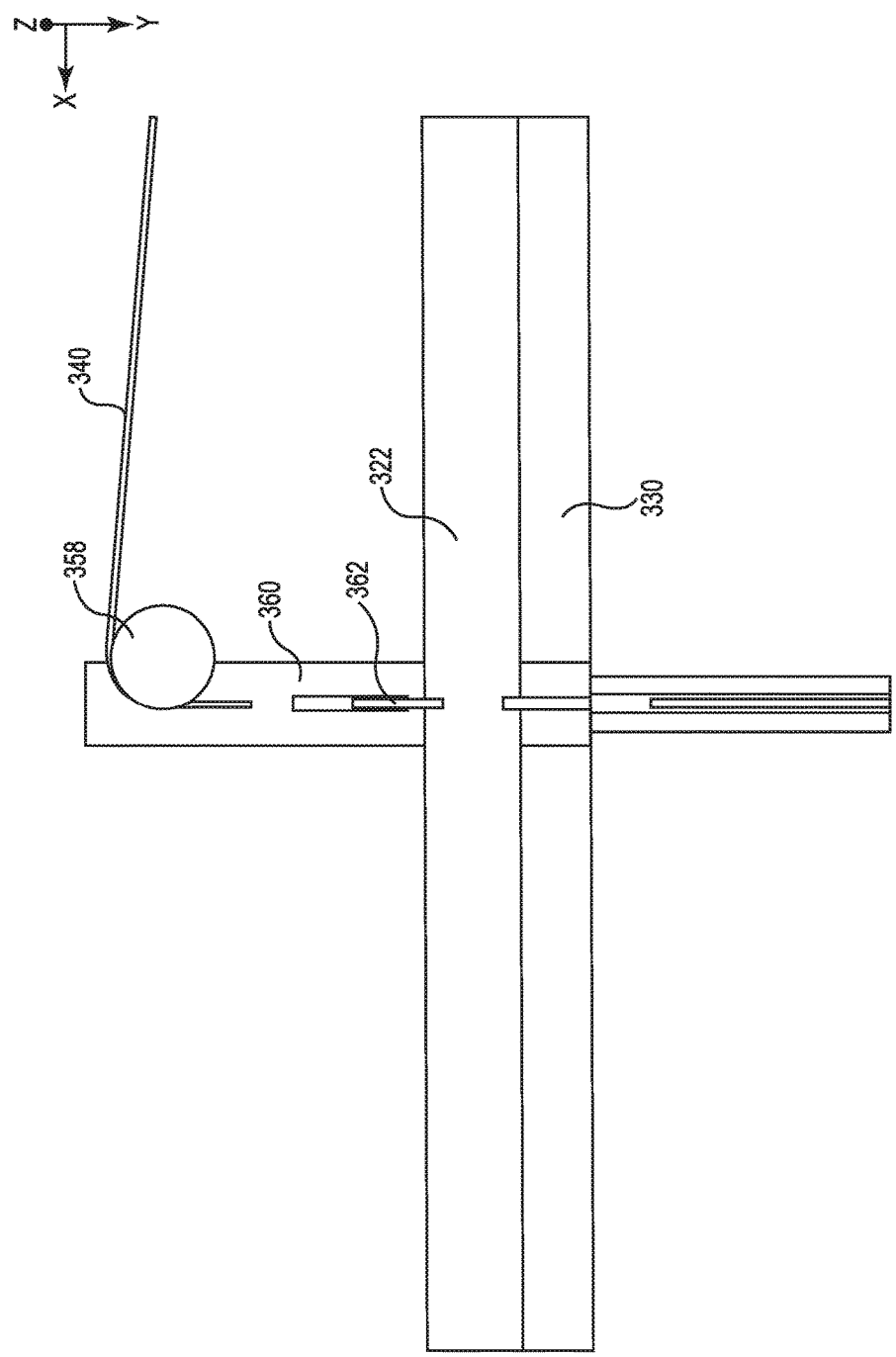
FIG. 17 illustrates one example of a heliostat.

Cables 340 are supported by and change direction by means of a series of pulleys 358, illustrated in more detail in FIG. 17. Pulley 358, for example directs cable 340 into a channel 360 that houses a trolley 362 that secures the blade and utilizes rollers within the channel (not shown) to guide the blade 322 across the mirror surface. Before the blade 322 contacts the mirror surface 323, the lower surface of the blade 322 contacts the upper edges of brush 330, cleaning off the dirt, dust and debris.

Figure 18:
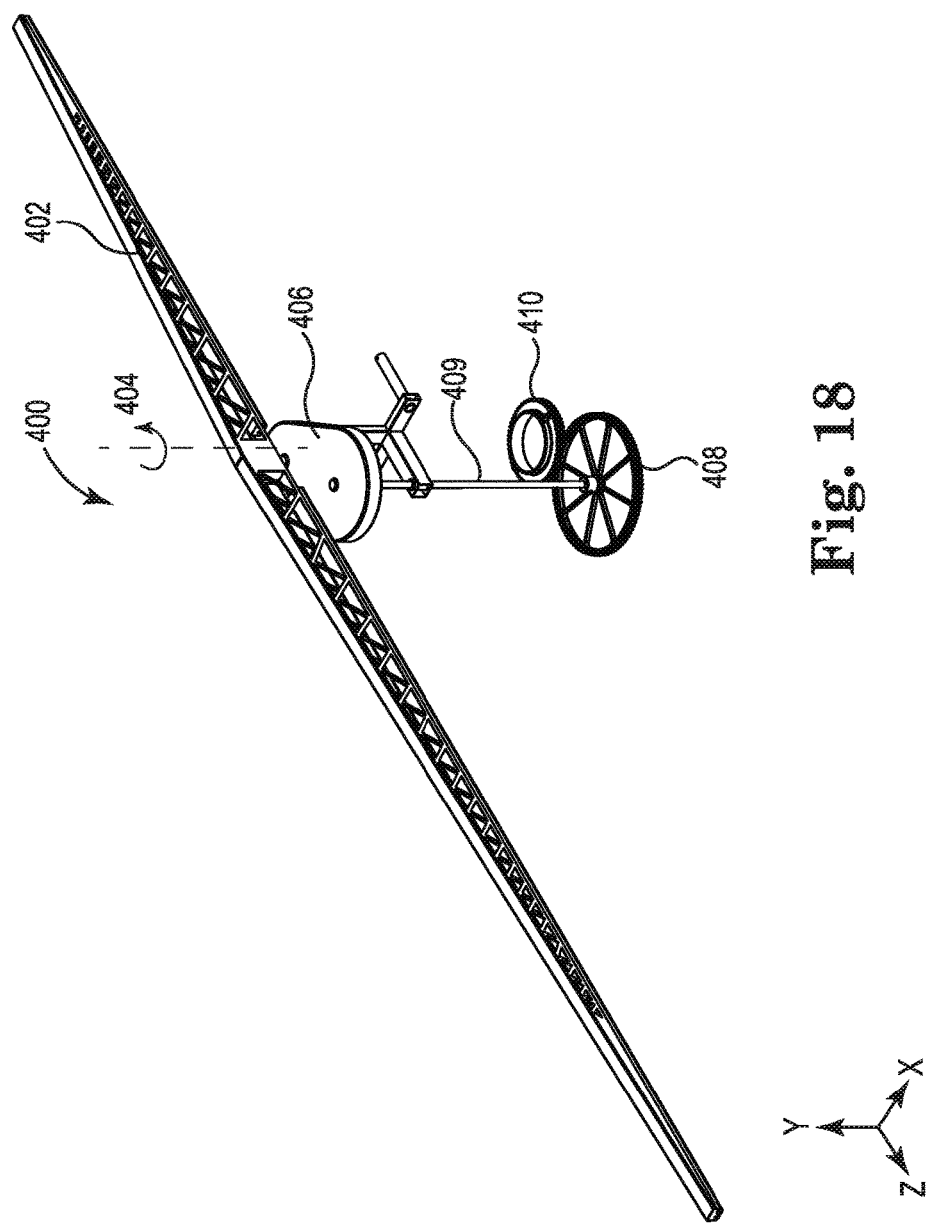
FIG. 18 illustrates one example of a heliostat.
Figure 19:
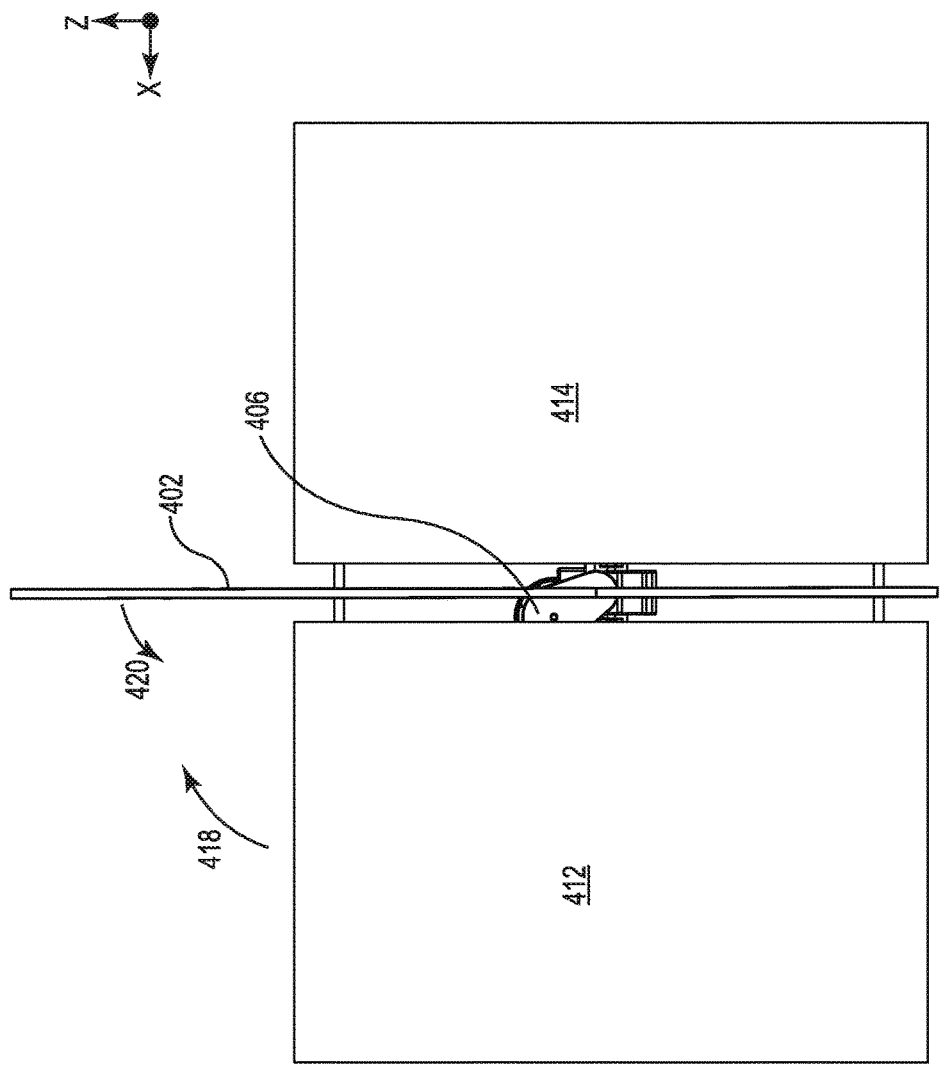
FIG. 19 illustrates one example of a heliostat.
Figure 20:
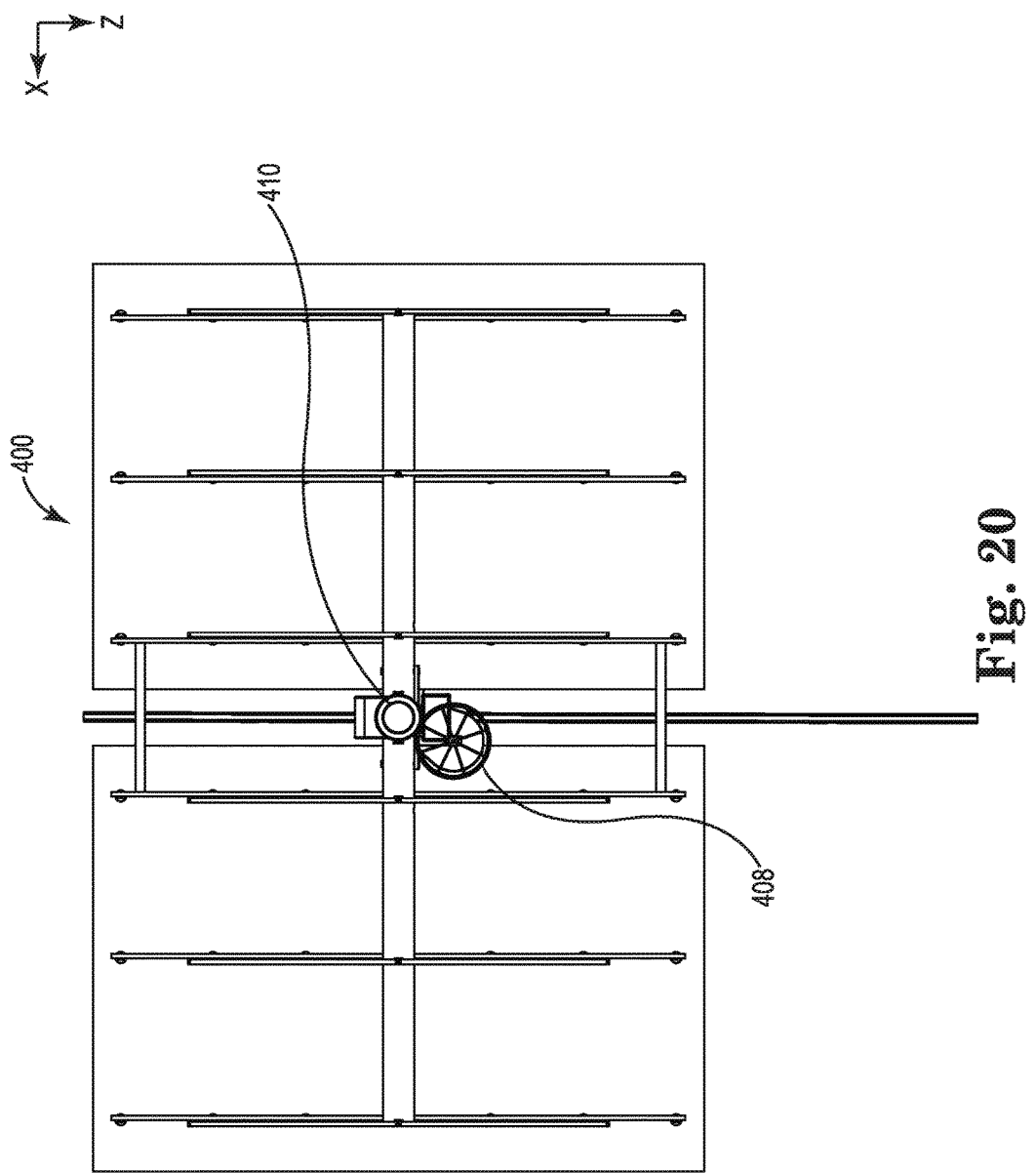
FIG. 20 illustrates one example of a heliostat.

In another example as illustrated in FIG. 18, a cleaning system 400 has a blade 402 that rotates about axis 404. A gearbox 406 causes rotation of the blade 402 about axis 404 when distally mounted drive gear 408 engages gear 410, which is mounted for rotation to the upper rotational portion of the heliostat. In this embodiment, when the frame supporting the mirrors 412 is rotating in one direction, the blade 402 is rotating in an opposite direction. A rotation of 180 degrees completely cleans the mirror surface. A top elevational view of this embodiment is shown in FIG. 19. As mirror surfaces 412 and 414 rotate about a vertical axis (into the paper) in a direction shown by arrow 418, blade 402 rotates in an opposite direction as shown by arrow 420. The reversal of direction is accomplished by gearbox 406. After the blade 402 and mirror surfaces have each rotated 180 degrees, both change direction and rotate another 180 degrees to complete a cleaning cycle. Brushes (not shown) clean the blade 402 at the beginning and end of each rotation. As illustrated in FIG. 20, looking at the back side of the heliostat with the mirrors in a substantially horizontal position, the gear 408 that drives shaft 409 that connects with gearbox 406 is engaged with gear 410. Gear 410 is fixed to the upper rotational portion of the heliostat 400.

Figure 21:
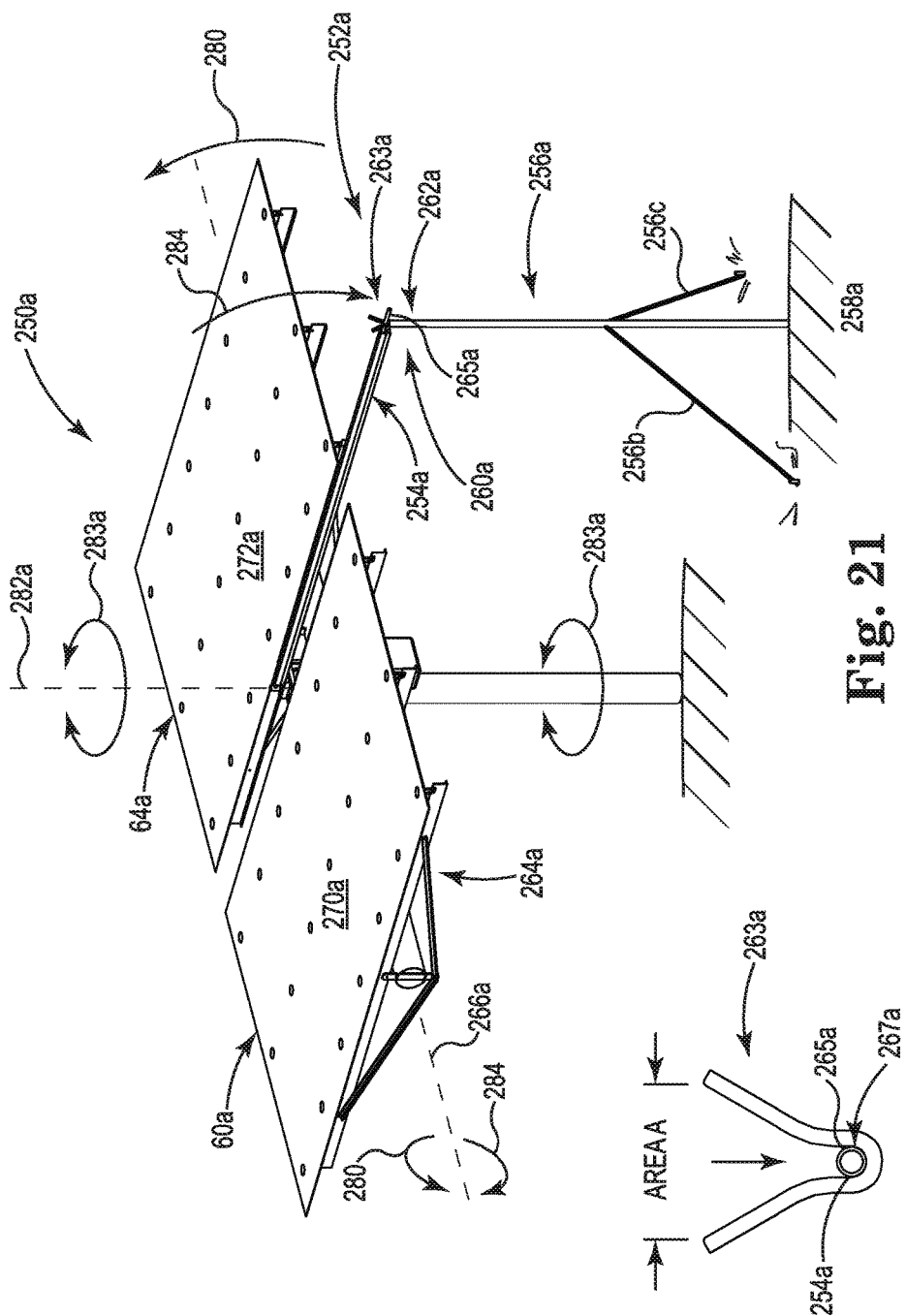
FIG. 21 illustrates one example of a heliostat including a cleaning mechanism and blade cleaning device.

FIG. 21 illustrates another example of a heliostat generally at 250a, which is similar to the heliostats previously described herein including heliostat 250 illustrated in FIG. 10 and FIG. 11. Heliostat 250a includes a cleaning system or mechanism 252a that includes a cleaning blade 254a and a support arm 256a. In one example, the support arm 256a is in the form of a post that is secured into a field plane (e.g., ground) 258a, and may include additional support members 256b and 256c. The support arm 256a is detachable from the blade 254a at a distal end 260a of the blade 254a, and the distal end of the support arm 262a, respectively. Support arm 256a includes a blade retention member 263a at the distal end 262a. In one example, the blade retention member 263a is a generally fork shaped member. When the heliostat frame 264a, including mirror surfaces 270a and 270b, rotates about a horizontal axis 266a during energy collection, the blade 254a is disengaged and is fixed with respect to the frame 264a including heliostat mirrors 60a, 64a (indicated by rotational arrow 280a). When the heliostat is moved from an operational position to a safety position, the heliostat frame 266a including mirrors 60a, 64a are first rotated about vertical axis 282a, indicated by rotational arrows 283a, to a first "zero" or "home" position. In the home position, cleaning blade 254a is positioned directly above the support arm 256a, and aligned with blade retention member 263a. The heliostat frame 264a including the mirrors is then rotated about horizontal axis 266a into a safety position, indicated by arrow 284. As the heliostat 250a is moved to the safety position, cleaning blade 254a is positioned in blade retention member 263a. Blade retention member 263a then operates to retain the blade 254a during one or more cleaning cycles of a cleaning operation.

Referring also to FIG. 21A, blade 254a has a blade extension 265a that securely fits within blade retention member 263a. In one example, blade retention member 263a is generally fork shaped, and includes an area of travel indicated as Area A. The width of Area A accounts for any minor misalignment between the heliostat zero or home position, and the support arm 256a. The generally fork shaped retention member 263a will act to guide the blade 254a (in one example blade extension 265a) into the retention member 263a, such that it is held in a fixed position relative to the mirrors during a cleaning operation. In one example, blade 254a is held in a retention slot 267a, of the blade retention member 263a.

Figure 22:
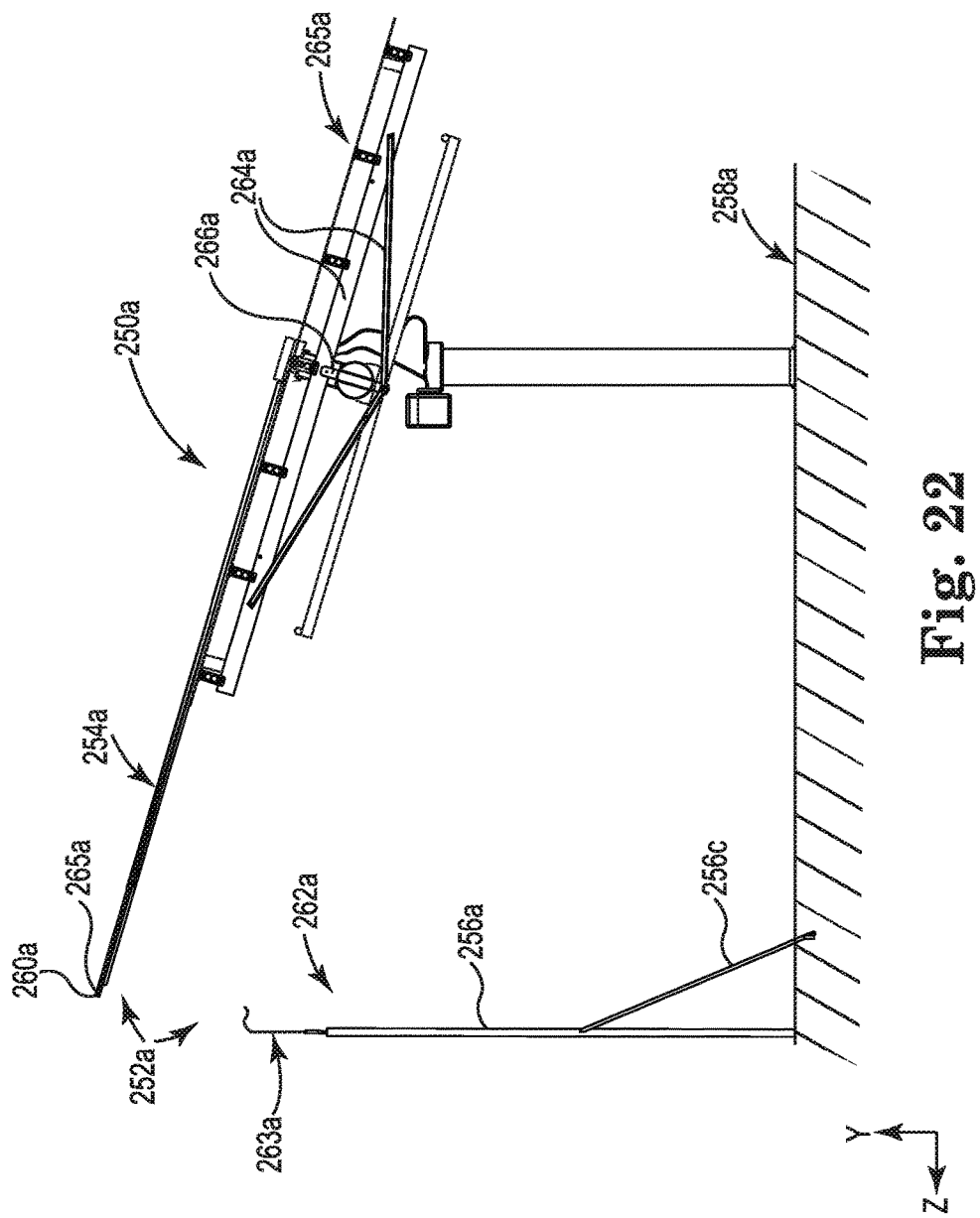
FIG. 22 illustrates one example of the heliostat of FIG. 21 in an operational position.
Figure 23:
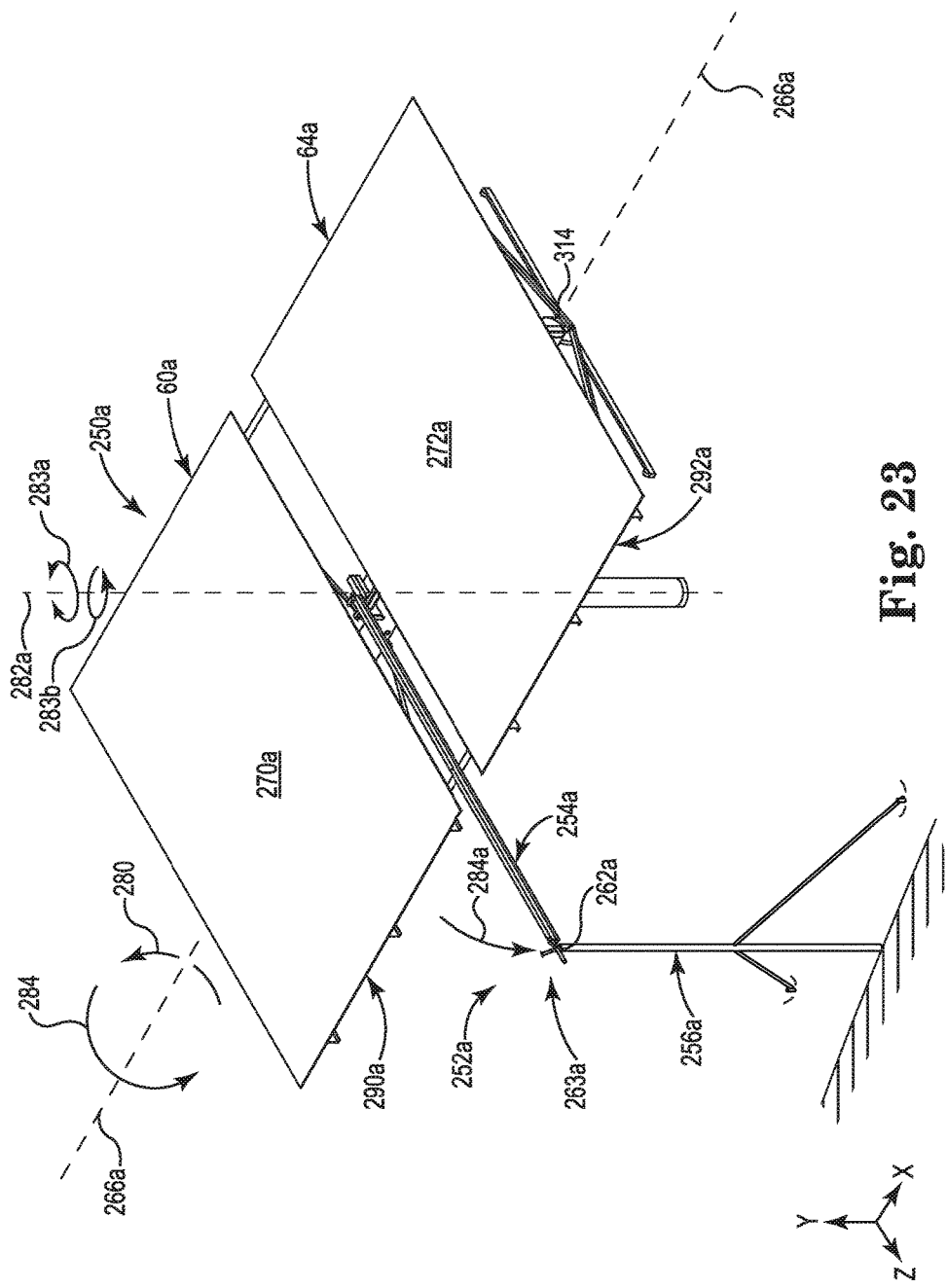
FIG. 23 illustrates a perspective view of one example of the heliostat of FIG. 21 in a safety or home position.

In reference also to FIG. 22, one example of heliostat 250a in an operational position. Frame 264a is tilted upward, releasing blade 254a from the support arm 256a blade retention member 263a. In the operational position, blade 254a is in a fixed position relative to the frame 264a and mirrors 60a, 64a, such that the mirrors are free to tilt and rotate to optimize their position relative to a daytime position of the sun and a CSP central collection tower. In reference also to FIG. 23, the heliostat 250a is moved from an operational position to a safety position. The heliostat frame 266a and mirrors 60a, 64a are first rotated about vertical axis 282a, indicated by rotational arrows 283a, to a first "zero" or "home" position. In the home position, cleaning blade 254a is positioned directly above the support arm 256a, and aligned with blade retention member 263a. The heliostat frame 264a including the mirrors 60a, 64a is then rotated about horizontal axis 266a into a safety position, indicated by arrow 284. As the heliostat 250a is moved to the safety position, cleaning blade 254a is positioned in blade retention member 263a. Blade retention member 263a then operates to retain the blade 254a during one or more cleaning cycles of a cleaning operation.

In the safety position, the frame 264a including mirrors 60a, 64a having mirror surfaces 270a, 272a of the heliostat 250a rotates about axis 282a in a first direction represented by rotational arrow 283a and then in an opposite direction 283b, engaging blade 254a with the slightly curved (e.g., concave) mirror surfaces 270a, 272a to remove unwanted material such as dust, dirt and debris. Heliostat 250a further includes blade cleaning devices 290a and 292a for cleaning the unwanted material from the blade 254a before, during, and after a cleaning operation.

FIG. 24 illustrates one example of a view of the blade cleaning devices 290a and 292a positioned on heliostat 250a. The blade cleaning device 290a is positioned on two sides of heliostat mirror 60a. The blade cleaning device 292a is positioned on two sides of heliostat mirror 64a. In one example, blade cleaning devices 290a and 292a are in the form of a blade cleaning edge that extends above a corresponding mirror surface 270a, 272a for cleaning the heliostat blade as it moves relative to the mirror surfaces 270a and 272a.

FIG. 25 is a partial section view illustrating one example of blade cleaning device 290a, taken along section A-A of FIG. 24. Reference is also made to FIG. 26, which is a partial perspective view of blade cleaning device 290a. In one example, blade cleaning device 290a is positioned immediately adjacent one or more edges of heliostat mirror 60a. Blade cleaning device 290a is an L shaped member, and includes a first side member 294a and a second side member 296a. Blade cleaning device 290a is secured to an edge of mirror 60a at an interface 295a between the device 290a and the mirror 60a. In one example, blade cleaning device 290a is secured about an edge of mirror 60a at interface 295a using an adhesive. Second side member 296a extends above mirror surface 270a, defining a scraper or blade cleaning edge 297a. As blade 254a moves relative to or across blade cleaning edge 297a, unwanted material that has collected on the blade 254a is removed from the blade 254a by the cleaning edge 297a. In one example, blade cleaning device 290a is made of a relatively thin, rigid material, such as metal. In other examples, blade cleaning device 290a is made of other materials, such as a polymeric material.

Figure 27:
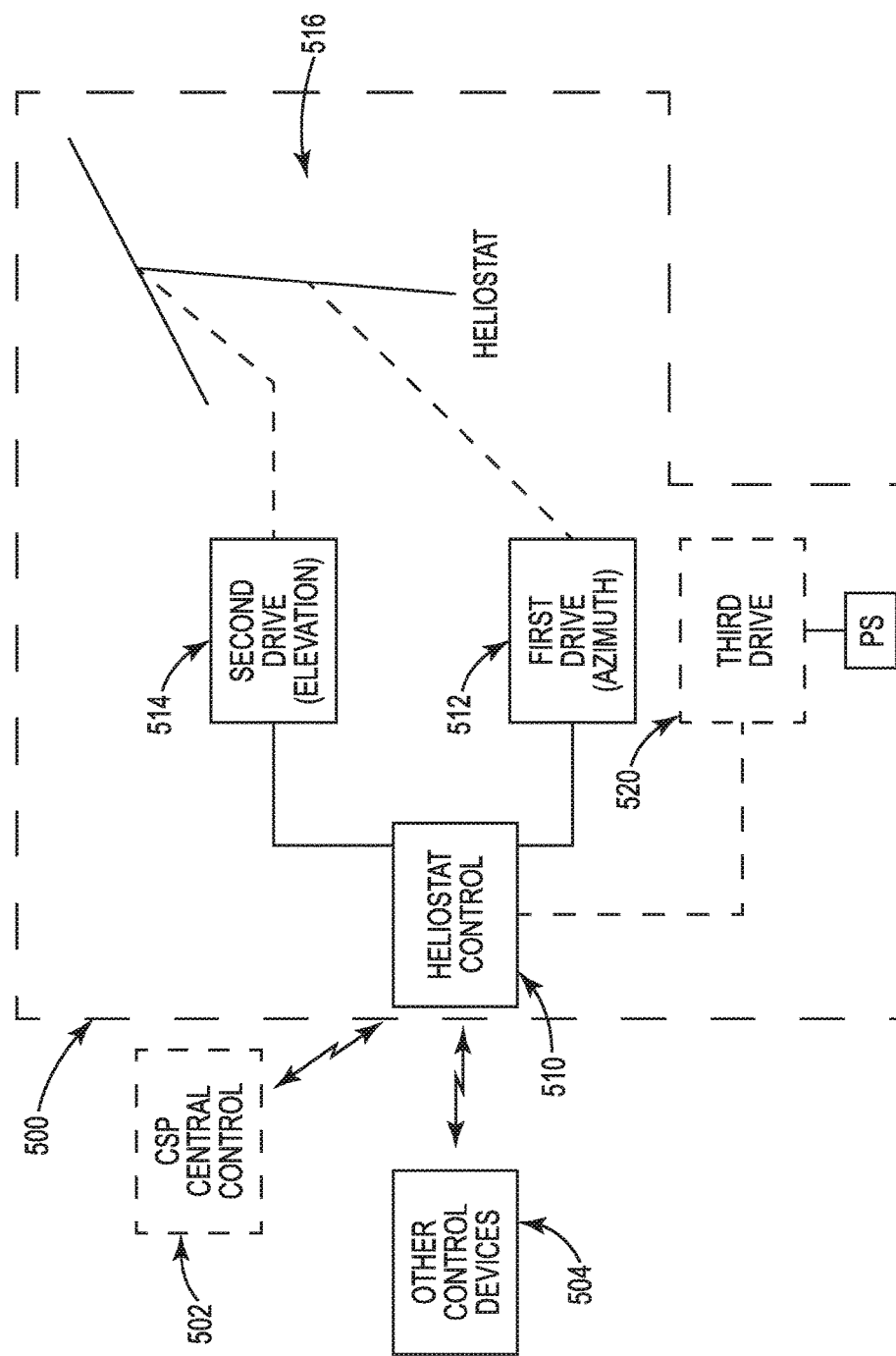
FIG. 27 illustrates one example of a heliostat system and control block diagram.

FIG. 27 illustrates one example of a heliostat system and control block diagram generally at 500 that may be part of a CSP plant. In one example, each heliostat includes its own dedicated control system 500. The control system 500 can communicate with a CSP central control system 502. Further, the control system 500 can communicate with other control devices 504, such as for programming of the control system 500.

In one example, control block diagram 500 includes a heliostat control 510 in communication with a first drive 512 and a second drive 514. In one example, first drive 512 is mechanically coupled to heliostat 516. Heliostat control 510 controls first drive 512 to operate as an azimuth drive to move heliostat 516 into a safety and desired operational positions. Heliostat control 510 controls second drive 514 to operate as an elevation drive to work with the first drive 512 to move heliostat 516 into desired operational positions. Further, heliostat control 510 operates first drive 512 to move heliostat 516 as desired during a mirror cleaning operation. As such, an additional drive or power source is not needed for heliostat 516 to operate in a cleaning mode. In other examples, a third drive 520 is provided that is mechanically coupled to heliostat 516. The third drive 520 may be provided for other heliostat operations, such as moving the mirrors relative to a cleaning mechanism during a cleaning operation. Each heliostat including the heliostat control can be powered from a conventional power grid installed for the array of heliostats, or could be powered from an alternative power source.

Cleaning systems of the present invention advantageously clean without water, or without requiring separate drive systems or additional infrastructure to the mirror field. Materials forming the blades clean by mechanical action upon the surfaces to be cleaned. The systems are adapted for cleaning surfaces that are approximately flat, but have differences in height due to the focal length of the glass structures. Then the blades are cleaned by passing over the blade cleaning device edge or bristled brushes, thus creating a 2 step cleaning process. Step one, cleaning blade removes soils from glass surface. Step 2, the cleaning device (e.g., edge or bristle brush) removes soils from cleaning blade. Nature keeps the cleaning device edge or bristle brush clean by wind and rain. These systems can be run nightly or as often as needed to keep CSP plants running at peak efficiency.

A programming addition to the heliostat control software automates the operation of the cleaning system. By using existing heliostat control and drive systems, cleaning systems may be incorporated at a reduced cost. Systems may be retrofitted into existing CSP plants or incorporated into the design of new CSP plants.

In one or more examples, the cleaning mechanism is a rotational cleaning mechanism that extends radially from a structure to be cleaned, such as a heliostat. In other examples, the cleaning mechanism is a translational cleaning mechanism that moves across a cleaning surface (e.g. a mirror) from one side to the other.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:
1. A heliostat comprising:
   a heliostat mirror surface;
   a heliostat cleaning mechanism in cleaning contact with the heliostat mirror surface; and a heliostat drive system that moves the heliostat mirror surface relative to the cleaning mechanism, removing material from the heliostat mirror surface, wherein the heliostat cleaning mechanism includes a flexible blade having a longitudinally extending edge in cleaning contact with the mirror surface; and a blade cleaning device, extending longitudinally in a fixed position along an edge of the heliostat mirror surface, that cleans the heliostat cleaning mechanism.

2. The heliostat of claim 1, wherein the cleaning contact is a friction contact.

3. The heliostat of claim 1, where the blade extends radially from a central axis of the heliostat.

4. The heliostat of claim 1, wherein the blade includes a soft abrasive layer in cleaning contact with the heliostat mirror surface.

5. The heliostat of claim 4, wherein the soft abrasive layer is a suede material.

6. The heliostat of claim 5, where the suede material is a synthetic suede material.

7. The heliostat of claim 1, wherein the blade comprises: a support structure, and a soft abrasive layer positioned over the support structure.

8. The heliostat of claim 7, comprising a cushioning layer positioned between the support structure and the soft abrasive layer.

9. The heliostat of claim 1, the blade cleaning device including an elongated brush fixedly positioned along an edge of the heliostat mirror surface.

10. A heliostat comprising:
a heliostat mirror system including a mirror surface;
a heliostat cleaning mechanism that moves across the mirror surface, including a blade having a longitudinally extending flexible surface in contact with the mirror surface, the longitudinally extending flexible surface being void of brush bristles; and
a blade cleaning mechanism including an elongated brush extending longitudinally in a fixed position along an edge of the mirror surface that cleans the heliostat cleaning mechanism.

11. The heliostat of claim 10, wherein the mirror surface includes a first position and a second position, where the first position is a safety position where the mirror surface is substantially horizontal relative to the earth when installed and where the heliostat cleaning mechanism cleans the mirror surface when it is in the first position.

12. The heliostat of claim 11, where when the mirror surface is in the second position the mirror surface tracks the position of the sun relative to a central receiving tower.

13. The heliostat of claim 10, where the mirror system includes a first mirror and a second mirror, and the blade cleaning mechanism that includes the elongated brush mounted on at least one side and longitudinally extends along an edge of the first mirror and the second mirror.

14. The heliostat of claim 10 comprising: a drive system including a first drive that rotates the mirror surface horizontally about a central axis, and a second drive that moves the mirror surface vertically to track the position of a light source.

15. The heliostat of claim 14, where the second drive also moves the mirror surface relative to the heliostat cleaning mechanism.

16. The heliostat of claim 10, comprising a control system in communication with a drive system for moving the mirror surface relative to the cleaning mechanism.

17. A heliostat having an energy collection position and a safe position comprising:

a heliostat mirror system including a first mirror and a second mirror, each mirror having a mirror surface;

a heliostat cleaning mechanism including a blade having a flexible surface in cleaning contact with the mirror surface, a heliostat drive system that moves the mirror surface relative to the cleaning mechanism, removing unwanted material from the mirror surface, the drive system including a first drive mechanism that moves the mirror surface relative to the blade when the heliostat system is in a safe position, and moves the mirror surface relative to a light source when the heliostat system is in an energy collection position; and a blade cleaning system having a brush extending longitudinally in a fixed position along an edge of the mirror surface for cleaning unwanted material from the blade after it moves across the mirror surface.

18. The heliostat of claim 17, comprising a support arm that supports the blade.

19. The heliostat of claim 18, comprising a saddle mechanism that supports a distal end of the support arm during a cleaning cycle.

20. A heliostat comprising:
a heliostat mirror surface;
a heliostat cleaning mechanism in cleaning contact with the heliostat mirror surface; and
a heliostat drive system that moves the heliostat mirror surface relative to the cleaning mechanism, removing material from the heliostat mirror surface,
wherein the heliostat cleaning mechanism includes a flexible blade having a longitudinally extending edge in cleaning contact with the mirror surface, the longitudinally extending edge being void of brush bristles;
a blade cleaning device, positioned along an edge of the heliostat mirror surface and attached to the heliostat, that cleans the heliostat cleaning mechanism;
the blade cleaning mechanism including an elongated brush fixedly positioned along an edge of the heliostat mirror surface; and
the elongated brush including brush members that extend beyond the heliostat mirror surface.

21. A heliostat comprising:
a heliostat mirror system including a mirror surface;
a cleaning mechanism longitudinally extending in a fixed position along an edge of the mirror surface that cleans a heliostat cleaning device after the heliostat cleaning device has moved across the mirror surface and cleaned the mirror surface.

22. The heliostat of claim 21, the heliostat mirror system including a first mirror and a second mirror, the cleaning mechanism including an elongated brush fixedly positioned along the edge of the heliostat mirror surface, including extending longitudinally in a fixed position along an edge of both the first mirror and the second mirror.

23. A heliostat comprising:
a heliostat mirror system including a mirror surface;
a heliostat cleaning mechanism void of brush bristles;
a cleaning mechanism fixedly positioned along an edge of the mirror surface that cleans the heliostat cleaning mechanism;
a heliostat drive system that moves the mirror surface;
the cleaning mechanism including an elongated brush extending longitudinally in a fixed positioned along an edge of the heliostat mirror surface; and
the elongated brush including brush members that extend beyond the heliostat mirror surface, wherein the cleaning mechanism cleans the heliostat cleaning mechanism after it moves across the mirror surface.

* * * * *